United States Patent
Zhang et al.

(10) Patent No.: US 10,880,818 B2
(45) Date of Patent: Dec. 29, 2020

(54) COVERAGE ENHANCEMENT TRANSMISSION APPARATUS, SYSTEM, AND METHOD FOR SYSTEM INFORMATION

(71) Applicant: Huawei Technologies Co., Ltd., Shenzhen (CN)

(72) Inventors: Xiangdong Zhang, Beijing (CN); Zheng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 706 days.

(21) Appl. No.: 15/217,789

(22) Filed: Jul. 22, 2016

(65) Prior Publication Data
US 2016/0337944 A1  Nov. 17, 2016

Related U.S. Application Data

(63) Continuation of application No. PCT/CN2014/071358, filed on Jan. 24, 2014.

(51) Int. Cl.
*H04W 48/12* (2009.01)
*H04W 4/70* (2018.01)
*H04L 5/14* (2006.01)

(52) U.S. Cl.
CPC ............ *H04W 48/12* (2013.01); *H04L 5/14* (2013.01); *H04W 4/70* (2018.02)

(58) Field of Classification Search
CPC ............ H04W 48/12; H04W 4/70; H04L 5/14
See application file for complete search history.

(56) References Cited

U.S. PATENT DOCUMENTS 9,961,595 B2 * 5/2018 Wu .................. H04W 36/0055
2010/0124919 A1   5/2010 Ko et al.
(Continued)

FOREIGN PATENT DOCUMENTS

CN    101472345 A    7/2009
CN    101500189 A    8/2009
(Continued)

OTHER PUBLICATIONS

Huawei, Hisilicon; "Coverage Enhancement for Physical Channels and Signals for Low-Cost MTC," Agenda 7.3.4; Discussion and Decision; R1-130017; 3GPP TSG RAN WG1 Meeting #72, St. Julian's, Malta, Jan. 28-Feb. 1, 2013; 9 pages. (Year: 2013).*
(Continued)

*Primary Examiner* — Andrew Lai
*Assistant Examiner* — Chuong M Nguyen
(74) *Attorney, Agent, or Firm* — Slater Matsil, LLP

(57) ABSTRACT

Provided is a network side device for a system message, including a determining unit and a transmission unit. The determining unit is configured to determine configuration information, where the configuration information is used to indicate a system message transmission configuration in a system message window; and the transmission unit is configured to send a system message on a resource indicated by the configuration information, so that a terminal device receives the system message according to the configuration information. In addition, another coverage enhancement transmission apparatus for a system message and a coverage enhancement transmission system and method for a system message are further provided.

11 Claims, 6 Drawing Sheets

(56) References Cited

U.S. PATENT DOCUMENTS

| | | | |
|---|---|---|---|
| 2010/0189039 A1 | 7/2010 | Wang et al. | |
| 2010/0296504 A1* | 11/2010 | Zhu | H04W 48/12 370/345 |
| 2010/0297991 A1 | 11/2010 | Dahlman et al. | |
| 2011/0117912 A1* | 5/2011 | Mahajan | H04W 48/12 455/434 |
| 2012/0063370 A1 | 3/2012 | Worrall | |
| 2014/0098761 A1* | 4/2014 | Lee | H04W 24/02 370/329 |
| 2014/0198726 A1* | 7/2014 | Xu | H04W 28/18 370/328 |
| 2015/0230249 A1* | 8/2015 | Nguyen | H04W 72/042 370/329 |
| 2015/0296518 A1* | 10/2015 | Yi | H04W 72/042 370/336 |
| 2015/0327154 A1 | 11/2015 | Xia | |
| 2015/0358996 A1* | 12/2015 | Fang | H04W 72/1278 370/280 |
| 2015/0365924 A1* | 12/2015 | Gao | H04L 1/189 370/329 |
| 2016/0338110 A1* | 11/2016 | Wang | H04W 74/0833 |

FOREIGN PATENT DOCUMENTS

| | | |
|---|---|---|
| CN | 101841866 A | 9/2010 |
| CN | 102149168 A | 8/2011 |
| CN | 102223690 A | 10/2011 |
| CN | 103534970 A | 1/2014 |
| CN | 103944664 A | 7/2014 |
| EP | 2835990 A1 * | 2/2015 ............ H04W 72/04 |
| JP | 2010530708 A | 9/2010 |
| WO | 2015042892 A1 | 4/2015 |

OTHER PUBLICATIONS

3rd Generation Partnership Project; "Technical Specification Group Radio Access Network; Evolved Universal Terrestrial Radio Access (E-UTRA); Radio Resource Control (RRC); Protocol Specification, Release 9;" 3GPP TS 36.331, V9.16.0, Sep. 2013, 262 pages. (Year: 2013).*

3rd Generation Partnership Project; "Technical Specification Group Radio Access Network; Evolved Universal Terrestrial Radio Access (E-UTRA); Radio Resource Control (RRC); Protocol Specification, Release 9;" 3GPP TS 36.331, V9.16.0, Sep. 2013, 262 pages.

Alcatel-Lucent, et al.; "PBCH Coverage Extension for MTC Devices," Agenda 7.2.4.2; Discussion and Decision; R1-130938; 3GPP TSG-RAN WG1 Meeting #72bis, Chicago, USA; Apr. 15-19, 2013; 4 pages.

Huawei, Hisilicon; "Coverage Enhancement for Physical Channels and Signals for Low-Cost MTC," Agenda 7.3.4; Discussion and Decision; R1-130017; 3GPP TSG RAN WG1 Meeting #72, St. Julian's, Malta, Jan. 28-Feb. 1, 2013; 9 pages.

Huawei, Hisilicon; "Discussion on (E) PDCCH and PUCCH Coverage Improvement for MTC UEs," Agenda 6.2.2.2.3; Discussion and Decision; R1-135021; 3GPP TSG RAN WG1 Meeting #75, San Franciso, USA; Nov. 11-15, 2013; 5 pages.

NSN, Nokia: "SIB Coverage Enhancement", 3GPP TSG RAN1#75, R1-135572, San Francisco, USA, Nov. 11-15, 2013 total 3 pages.

ZTE: "Coverage Enhancement of Physical Broadcast Channel and SIB Transmission", 3GPP TSG RAN WG1 Meeting #74bis, R1-134302, total 7 pages.

* cited by examiner

| (n) coverage enhancement requirements (optional) | (m) coverage enhancement levels (optional) | (x) requirements of repetition times (optional) | (y) requirements of receiving attempt times of a terminal (optional) | (z) system message configurations | (c) system message transmission configurations in a system message window |
|---|---|---|---|---|---|

| Coverage enhancement requirement 1 | Coverage enhancement requirement 2 | ... | Coverage enhancement requirement n |
|---|---|---|---|
| Coverage enhancement level 1 | Coverage enhancement level 2 | ... | Coverage enhancement level n |
| x1 times of repetition that are required | x2 times of repetition that are required | ... | xn times of repetition that are required |
| y1 receiving attempts of a terminal that are required | y2 receiving attempts of the terminal that are required | ... | Yn receiving attempt times of the terminal that are required |
| System message configuration 1 | System message configuration 1 | ... | System message configuration 1 |
| System message transmission configuration 11 in a system message window (t1 subframes, #s11, #s12, ..., #s1t1) | System message transmission configuration 12 in the system message window (t2 subframes, #s21, #s22, ..., #s2t2) | ... | System message transmission configuration 1n in the system message window (tn subframes, #sn1, #sn2, ..., #sntn) |

| Coverage enhancement requirement 1 | Coverage enhancement requirement 2 | ... | Coverage enhancement requirement n |
|---|---|---|---|
| Coverage enhancement level 1 | Coverage enhancement level 2 | ... | Coverage enhancement level n |
| x1 times of repetition that are required | x2 times of repetition that are required | ... | xn times of repetition that are required |
| Y1 receiving attempt times of a terminal that are required | Y2 receiving attempt times of the terminal that are required | ... | Yn receiving attempt times of the terminal that are required |
| System message configuration z | System message configuration z | ... | System message configuration z |
| System message transmission configuration z1 in the system message window (t1 subframes, #s11, #s12, ..., #s1t1) | System message transmission configuration z2 in the system message window (t2 subframes, #s21, #s22, ..., #s2t2) | ... | System message transmission configuration zn in the system message window (tn subframes, #sn1, #sn2, ..., #sntn) |

FIG. 1c

COVERAGE ENHANCEMENT TRANSMISSION APPARATUS, SYSTEM, AND METHOD FOR SYSTEM INFORMATION

CROSS-REFERENCE TO RELATED APPLICATIONS

This application is a continuation of International Application No. PCT/CN2014/071358, filed on Jan. 24, 2014, which is hereby incorporated by reference in its entirety.

TECHNICAL FIELD

The present invention relates to the field of communications technologies, and specifically, to a coverage enhancement transmission apparatus, system, and method for a system message.

BACKGROUND

The Internet of Things refers to a network in which information about a physical world is acquired by deploying various devices that have a specific capability of perception, calculation, execution, and communication, and information transmission, coordination, and processing are implemented by using the network, so that interconnections between a person and a thing and between things are implemented. For brevity, the Internet of Things is intended to implement interconnections between a person and a thing and between things.

Honored as the third wave of the information industry following computers and the Internet, development of the Internet of Things is highly expected, and greatly appreciated and valued by research institutes and the industry. In addition, a related standards organization also initiates standardization work of a technology related to the Internet of Things. Machine type communication (MTC) is one of applications of the Internet of Things. In order that an MTC device with a relatively heavy loss, for example, an MTC device located in a basement, can access a network and obtain a service, the standards organization proposes a technology for enhancing or optimizing mobile communication network coverage. Signal repetition is one of methods for implementing coverage enhancement. In addition, for MTC devices located in different environments, different coverage enhancement degrees may be further used; for example, different signal repetition times are used.

According to an existing protocol, a system message may include a master information block (MIB), a system information block 1 (SIB1), and various other system information blocks (SIB) such as a SIB2 and a SIB3 encapsulated into system message (SI) commands. Different system messages are transmitted in different message windows, and a system defines window lengths (SI-WindowLength) and periods (SI-Period) for the message windows (SI-window) of these system messages. The period actually defines how often a system message window occurs. In a system message window, a system message may be transferred once or for multiple times, and scheduled over a physical downlink control channel (PDCCH), scrambled by using an SI-RNTI. A terminal device also determines, by performing, in the system message window, blind detection on the PDCCH scrambled by using the SI-RNTI, whether there is a to-be-transferred system message, and detects whether there is corresponding scheduling information of the system message. That is, a system message configuration and a system message transmission configuration that is in the system message window (for example, a configuration case in which a system message is to be transferred in which subframe in the system message window) are not known by the terminal device, and are determined by a base station.

In a process of research and practice of the prior art, the inventor of the present invention finds that for coverage enhancement, if a terminal device cannot exactly know a system message transmission configuration in a system message window, it is not helpful for performing operations such as a receiving and combination operation and a receiving attempt (keep trying) operation, which increases processing complexity of the terminal device, and affects a coverage enhancement effect.

SUMMARY

Embodiments of the present invention provide a coverage enhancement transmission apparatus, system, and method for a system message, so that a terminal device can exactly know a system message transmission configuration in a system message window; therefore, it is helpful for the terminal device to subsequently perform operations such as a receiving and combination operation and a receiving attempt (keep trying) operation, which reduces processing complexity of the terminal device, and improves a coverage enhancement effect.

According to a first aspect, an embodiment of the present invention provides a network side device, including a determining unit and a transmission unit. The determining unit is configured to determine configuration information. The configuration information is used to indicate a system message transmission configuration in a system message window. The transmission unit is configured to send a system message on a resource indicated by the configuration information, so that a terminal device receives the system message according to the configuration information.

In a first possible implementation manner, with reference to the first aspect, the network side device for a system information may further include a notification unit. The notification unit is configured to notify the terminal device of the configuration information.

In a second possible implementation manner, with reference to the first aspect, the determining unit is specifically configured to determine the configuration information according to a configuration rule agreed by the network side device and the terminal device.

In a third possible implementation manner, with reference to the first aspect, or the first or the second possible implementation manner of the first aspect, the transmission unit is specifically configured to: when the system message transmission configuration indicates that the system message is to be transmitted in all available subframes in the system message window, send the system message in all the available subframes in the system message window.

In a fourth possible implementation manner, with reference to the first aspect, or the first or the second possible implementation manner of the first aspect, the determining unit is specifically configured to: acquire a system message configuration, where the system message configuration includes a configuration of a window length of the system message window and a configuration of a system message period; and determine the configuration information according to the acquired system message configuration.

In a fifth possible implementation manner, with reference to the first aspect, or the first or the second possible implementation manner of the first aspect, the determining unit is specifically configured to: acquire coverage enhancement requirement information of the system message, coverage enhancement level information of the system message, repetition times requirement information of the system message, and/or receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the first aspect, the determining unit is specifically configured to: determine a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message configuration.

In a seventh possible implementation manner, with reference to the fifth possible implementation manner of the first aspect, the determining unit is specifically configured to: determine transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, information about a subframe used when the system message is transmitted, where the information about the subframe includes at least a location of the subframe.

In an eighth possible implementation manner, with reference to the seventh possible implementation manner of the first aspect, the determining unit is specifically configured to: when the window length is sufficient to transmit N system messages, select a subframe from the system message window to transmit the system message, or extend the system message window, and select a subframe from the extended system message window to transmit the system message, where N is the transmission times; or when the window length is not sufficient to transmit N system messages, extend the system message window, and select a subframe from the extended system message window to transmit the system message.

In a ninth possible implementation manner, with reference to the seventh possible implementation manner of the first aspect, the determining unit is specifically configured to select, according to the window length and the transmission times, a subframe from multiple consecutive system message windows of the determining unit to transmit the system message.

In a tenth possible implementation manner, with reference to the seventh possible implementation manner of the first aspect, the determining unit is specifically configured to: acquire a system message period; determine whether the system message period exceeds a preset period threshold. If the period exceeds the period threshold, when it is determined that the window length is sufficient to transmit N system messages, select a subframe from the system message window to transmit the system message, or extend the system message window, and select a subframe from the extended system message window to transmit the system message, or when the window length is not sufficient to transmit N system messages, extend the system message window, and select a subframe from the extended system message window to transmit the system message, where N is the transmission times. Alternatively, if the period does not exceed the period threshold, select, according to the window length and the transmission times, a subframe from multiple consecutive system message windows to transmit the system message.

In an eleventh possible implementation manner, with reference to the seventh possible implementation manner of the first aspect, the determining unit is specifically configured to: determine receiving attempt times of the terminal device according to the receiving attempt times requirement information of the terminal device, and when it is determined that the receiving attempt times are greater than a preset threshold, extend the system message window; and select, according to the window length and the transmission times, a subframe from the extended system message window to transmit the system message.

According to a second aspect, an embodiment of the present invention further provides a terminal device, including a determining unit and a receiving unit. The determining unit is configured to determine configuration information, where the configuration information is used to indicate a system message transmission configuration in a system message window. The receiving unit is configured to receive, on a resource indicated by the configuration information, a system message sent by a base station device.

In a first possible implementation manner, with reference to the second aspect, the receiving unit is further configured to: before the configuration information is determined, receive a notification that is about the configuration information and sent by the base station device. The determining unit is specifically configured to determine the configuration information according to the notification.

In a second possible implementation manner, with reference to the second aspect, the determining unit is specifically configured to determine the configuration information according to a configuration rule agreed by the terminal device and the base station device.

In a third possible implementation manner, with reference to the second aspect, or the first or the second possible implementation manner of the second aspect, the receiving unit is specifically configured to: when the system message transmission configuration indicates that the system message is to be transmitted in all available subframes in the system message window, receive, in all the available subframes in the system message window, the system message sent by the base station device.

In a fourth possible implementation manner, with reference to the second possible implementation manner of the second aspect, the determining unit is specifically configured to: acquire a system message configuration, where the system message configuration includes a configuration of a window length of the system message window and a configuration of a system message period; and determine the configuration information according to the acquired system message configuration.

In a fifth possible implementation manner, with reference to the second possible implementation manner of the second aspect, the determining unit is specifically configured to: acquire coverage enhancement requirement information of the system message, coverage enhancement level information of the system message, repetition times requirement information of the system message, and/or receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the second aspect, the determining unit is specifically configured to: determine a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message.

In a seventh possible implementation manner, with reference to the fifth possible implementation manner of the second aspect, the determining unit is specifically configured to: determine transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, information about a subframe used when the base station device transmits the system message, where the information about the subframe includes at least a location of the subframe.

In an eighth possible implementation manner, with reference to the seventh possible implementation manner of the second aspect, the determining unit is specifically configured to: when the window length is sufficient to transmit N system messages, select a subframe from the system message window to receive the system message sent by the base station device, or extend the system message window, and select a subframe from the extended system message window to receive the system message sent by the base station device, where N is the transmission times; or when the window length is not sufficient to transmit N system messages, extend the system message window, and select a subframe from the extended system message window to receive the system message sent by the base station device.

In a ninth possible implementation manner, with reference to the seventh possible implementation manner of the second aspect, the determining unit is specifically configured to select, according to the window length and the transmission times, a subframe from multiple consecutive system message windows to receive the system message sent by the base station device.

In a tenth possible implementation manner, with reference to the seventh possible implementation manner of the second aspect, the determining unit is specifically configured to: acquire a system message period; determine whether the system message period exceeds a preset period threshold; and if the period exceeds the period threshold, when it is determined that the window length is sufficient to transmit N system messages, select a subframe from the system message window to receive the system message sent by the base station device, or extend the system message window, and select a subframe from the extended system message window to receive the system message sent by the base station device, or when the window length is not sufficient to transmit N system messages, extend the system message window, and select a subframe from the extended system message window to receive the system message sent by the base station device, where N is the transmission times. Alternatively, if the period does not exceed the period threshold, select, according to the window length and the transmission times, a subframe from multiple consecutive system message windows to receive the system message sent by the base station device.

In an eleventh possible implementation manner, with reference to the seventh possible implementation manner of the second aspect, the determining unit is specifically configured to: determine receiving attempt times of the terminal device according to the receiving attempt times requirement information of the terminal device, and when it is determined that the receiving attempt times are greater than a preset threshold, extend the system message window; and select, according to the window length and the transmission times, a subframe from the extended system message window to receive the system message sent by the base station device.

According to a third aspect, an embodiment of the present invention further provides a communications system, including any network side device and any terminal device provided in the embodiments of the present invention.

According to a fourth aspect, an embodiment of the present invention further provides a coverage enhancement transmission method for a system message, including: determining configuration information, where the configuration information is used to indicate a system message transmission configuration in a system message window; and sending a system message on a resource indicated by the configuration information, so that a terminal device receives the system message according to the configuration information.

In a first possible implementation manner, with reference to the fourth aspect, after the determining configuration information, the method further includes notifying the terminal device of the configuration information.

In a second possible implementation manner, with reference to the fourth aspect, the determining configuration information includes determining the configuration information according to a configuration rule agreed by a network side device and the terminal device.

In a third possible implementation manner, with reference to the fourth aspect, or the first or the second possible implementation manner of the fourth aspect, when the system message transmission configuration indicates that the system message is to be transmitted in all available subframes in the system message window, the sending a system message on a resource indicated by the configuration information includes sending the system message in all the available subframes in the system message window.

In a fourth possible implementation manner, with reference to the fourth aspect, or the first or the second possible implementation manner of the fourth aspect, the determining configuration information includes acquiring a system message configuration, where the system message configuration includes a configuration of a window length of the system message window and a configuration of a system message period; and determining the configuration information according to the acquired system message configuration.

In a fifth possible implementation manner, with reference to the fourth aspect, or the first or the second possible implementation manner of the fourth aspect, the determining configuration information includes acquiring coverage enhancement requirement information of the system message, coverage enhancement level information of the system message, repetition times requirement information of the system message, and/or receiving attempt times requirement information of the terminal device; and determining the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the fourth aspect, the determining the configuration information according to the acquired coverage enhancement requirement information of the system message, the acquired coverage enhancement level information of the system message, the acquired repetition times requirement information of the system message, and/or the acquired receiving attempt times requirement information of the terminal device includes determining a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determining the configuration information according to the determined system message configuration.

In a seventh possible implementation manner, with reference to the fifth possible implementation manner of the fourth aspect, if the system message transmission configuration includes information about a subframe used when the system message is transmitted, the determining the configuration information according to the acquired coverage enhancement requirement information of the system message, the acquired coverage enhancement level information of the system message, the acquired repetition times requirement information of the system message, and/or the acquired receiving attempt times requirement information of the terminal device includes: determining transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquiring a window length of the system message window; and determining, according to the window length and the transmission times, the information about the subframe used when the system message is transmitted, where the information about the subframe includes at least a location of the subframe.

In an eighth possible implementation manner, with reference to the seventh possible implementation manner of the fourth aspect, the determining, according to the window length and the transmission times, the information about the subframe used when the system message is transmitted includes: if the window length is sufficient to transmit N system messages, selecting a subframe from the system message window to transmit the system message, or extending the system message window, and selecting a subframe from the extended system message window to transmit the system message, where N is the transmission times; or if the window length is not sufficient to transmit N system messages, extending the system message window, and selecting a subframe from the extended system message window to transmit the system message.

In a ninth possible implementation manner, with reference to the seventh possible implementation manner of the fourth aspect, the determining, according to the window length and the transmission times, the information about the subframe used when the system message is transmitted includes: selecting, according to the window length and the transmission times, a subframe from multiple consecutive system message windows to transmit the system message.

In a tenth possible implementation manner, with reference to the seventh possible implementation manner of the fourth aspect, the method further includes: acquiring a system message period; and the determining, according to the window length and the transmission times, the information about the subframe used when the system message is transmitted includes: determining whether the system message period exceeds a preset period threshold; and if the period exceeds the period threshold, when it is determined that the window length is sufficient to transmit N system messages, selecting a subframe from the system message window to transmit the system message, or extending the system message window, and selecting a subframe from the extended system message window to transmit the system message; or when the window length is not sufficient to transmit N system messages, extending the system message window, and selecting a subframe from the extended system message window to transmit the system message, where N is the transmission times; or if the period does not exceed the period threshold, selecting, according to the window length and the transmission times, a subframe from multiple consecutive system message windows to transmit the system message.

In an eleventh possible implementation manner, with reference to the seventh possible implementation manner of the fourth aspect, before the determining, according to the window length and the transmission times, the information about the subframe used when the system message is transmitted, the method further includes: determining receiving attempt times of the terminal device according to the receiving attempt times requirement information of the terminal device, and when it is determined that the receiving attempt times are greater than a preset threshold, extending the system message window; and the determining, according to the window length and the transmission times, the information about the subframe used when the system message is transmitted includes: selecting, according to the window length and the transmission times, a subframe from the extended system message window to transmit the system message.

According to a fifth aspect, an embodiment of the present invention further provides a coverage enhancement transmission method for a system message, including: determining configuration information, where the configuration information is used to indicate a system message transmission configuration in a system message window; and receiving, on a resource indicated by the configuration information, a system message sent by a base station device.

In a first possible implementation manner, with reference to the fifth aspect, before the determining configuration information, the method further includes: receiving a notification that is about the configuration information and sent by the base station device; and the determining configuration information includes: determining the configuration information according to the notification.

In a second possible implementation manner, with reference to the fifth aspect, the determining configuration information includes: determining the configuration information according to a configuration rule agreed by a terminal device and the base station device.

In a third possible implementation manner, with reference to the fifth aspect, or the first or the second possible implementation manner of the fifth aspect, when the system message transmission configuration indicates that the system message is to be transmitted in all available subframes in the system message window, the receiving, on a resource indicated by the configuration information, a system message sent by a base station device includes: receiving, in all the available subframes in the system message window, the system message sent by the base station device.

In a fourth possible implementation manner, with reference to the second possible implementation manner of the fifth aspect, the determining the configuration information according to a configuration rule agreed by a terminal device and the base station device includes: acquiring a system message configuration, where the system message configuration includes a configuration of a window length of the system message window and a configuration of a system message period; and determining the configuration information according to the acquired system message configuration.

In a fifth possible implementation manner, with reference to the second possible implementation manner of the fifth aspect, the determining the configuration information according to a configuration rule agreed by a terminal device and the base station device includes: acquiring coverage enhancement requirement information of the system message, coverage enhancement level information of the system message, repetition times requirement information of the system message, and/or receiving attempt times requirement information of the terminal device; and determining the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the fifth aspect, the determining the configuration information according to the acquired coverage enhancement requirement information of the system message, the acquired coverage enhancement level information of the system message, the acquired repetition times requirement information of the system message, and/or the acquired receiving attempt times requirement information of the terminal device includes: determining a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determining the configuration information according to the determined system message.

In a seventh possible implementation manner, with reference to the fifth possible implementation manner of the fifth aspect, if the system message transmission configuration includes information about a subframe used when the base station device transmits the system message, the determining the configuration information according to the acquired coverage enhancement requirement information of the system message, the acquired coverage enhancement level information of the system message, the acquired repetition times requirement information of the system message, and/or the acquired receiving attempt times requirement information of the terminal device includes: determining transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquiring a window length of the system message window; and determining, according to the window length and the transmission times, the information about the subframe used when the base station device transmits the system message, where the information about the subframe includes at least a location of the subframe.

In an eighth possible implementation manner, with reference to the seventh possible implementation manner of the fifth aspect, the determining, according to the window length and the transmission times, the information about the subframe used when the base station device transmits the system message includes: if the window length is sufficient to transmit N system messages, selecting a subframe from the system message window to receive the system message sent by the base station device, or extending the system message window, and selecting a subframe from the extended system message window to receive the system message sent by the base station device, where N is the transmission times; or if the window length is not sufficient to transmit N system messages, extending the system message window, and selecting a subframe from the extended system message window to receive the system message sent by the base station device.

In a ninth possible implementation manner, with reference to the seventh possible implementation manner of the fifth aspect, the determining, according to the window length and the transmission times, the information about the subframe used when the base station device transmits the system message includes: selecting, according to the window length and the transmission times, a subframe from multiple consecutive system message windows to receive the system message sent by the base station device.

In a tenth possible implementation manner, with reference to the seventh possible implementation manner of the fifth aspect, the method further includes: acquiring a system message period; and the determining, according to the window length and the transmission times, the information about the subframe used when the base station device transmits the system message includes: determining whether the system message period exceeds a preset period threshold. If the period exceeds the period threshold, when it is determined that the window length is sufficient to transmit N system messages, selecting a subframe from the system message window to receive the system message sent by the base station device, or extending the system message window, and selecting a subframe from the extended system message window to receive the system message sent by the base station device; or when the window length is not sufficient to transmit N system messages, extending the system message window, and selecting a subframe from the extended system message window to receive the system message sent by the base station device, where N is the transmission times. If the period does not exceed the period threshold, selecting, according to the window length and the transmission times, a subframe from multiple consecutive system message windows to receive the system message sent by the base station device.

In an eleventh possible implementation manner, with reference to the seventh possible implementation manner of the fifth aspect, before the determining, according to the window length and the transmission times, the information about the subframe used when the base station device transmits the system message, the method further includes: determining receiving attempt times of the terminal device according to the receiving attempt times requirement information of the terminal device, and when it is determined that the receiving attempt times are greater than a preset threshold, extending the system message window; and the determining, according to the window length and the transmission times, the information about the subframe used when the base station device transmits the system message includes: selecting, according to the window length and the transmission times, a subframe from the extended system message window to receive the system message sent by the base station device.

According to a sixth aspect, an embodiment of the present invention further provides a base station device, including: a processor, a memory configured to store data, and a receive and transmit interface configured to receive and transmit data, where the processor is configured to: determine configuration information, where the configuration information is used to indicate a system message transmission configuration in a system message window; and control the receive and transmit interface to send a system message on a resource indicated by the configuration information; and the receive and transmit interface is configured to send, under the control of the processor, the system message on the resource indicated by the configuration information, so that a terminal device receives the system message according to the configuration information.

In a first possible implementation manner, with reference to the sixth aspect, the processor is further configured to control the receive and transmit interface to notify the terminal device of the configuration information; and the receive and transmit interface is configured to notify the terminal device of the configuration information under the control of the processor.

In a second possible implementation manner, with reference to the sixth aspect, the processor is specifically configured to determine the configuration information according to a configuration rule agreed by the base station device and the terminal device.

In a third possible implementation manner, with reference to the sixth aspect, or the first or the second possible implementation manner of the sixth aspect, the processor is specifically configured to: when the system message transmission configuration indicates that the system message is to be transmitted in all available subframes in the system message window, control the receive and transmit interface to send the system message in all the available subframes in the system message window; and the receive and transmit interface is specifically configured to send the system message in all the available subframes in the system message window under the control of the processor.

In a fourth possible implementation manner, with reference to the sixth aspect, or the first or the second possible implementation manner of the sixth aspect, the processor is specifically configured to: acquire a system message configuration, where the system message configuration includes a configuration of a window length of the system message window and a configuration of a system message period; and determine the configuration information according to the acquired system message configuration.

In a fifth possible implementation manner, with reference to the sixth aspect, or the first or the second possible implementation manner of the sixth aspect, the processor is specifically configured to: acquire coverage enhancement requirement information of the system message, coverage enhancement level information of the system message, repetition times requirement information of the system message, and/or receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the sixth aspect, the processor is specifically configured to: determine a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message.

In a seventh possible implementation manner, with reference to the fifth possible implementation manner of the sixth aspect, the processor is specifically configured to: determine transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, information about a subframe used when the base station device transmits the system message, where the information about the subframe includes at least a location of the subframe.

According to a seventh aspect, an embodiment of the present invention further provides a terminal device, including: a processor, a memory configured to store data, and a receive and transmit interface configured to receive and transmit data, where the processor is configured to determine configuration information, where the configuration information is used to indicate a system message transmission configuration in a system message window; and the receive and transmit interface is configured to receive, on a resource indicated by the configuration information, a system message sent by a base station device.

In a first possible implementation manner, with reference to the seventh aspect, the receive and transmit interface is further configured to receive a notification that is about the configuration information and sent by the base station device; and the processor is specifically configured to determine the configuration information according to the notification.

In a second possible implementation manner, with reference to the seventh aspect, the processor is specifically configured to determine the configuration information according to a configuration rule agreed by the terminal device and the base station device.

In a third possible implementation manner, with reference to the seventh aspect, or the first or the second possible implementation manner of the seventh aspect, the receive and transmit interface is specifically configured to: when the system message transmission configuration indicates that the system message is to be transmitted in all available subframes in the system message window, receive, in all the available subframes in the system message window, the system message sent by the base station device.

In a fourth possible implementation manner, with reference to the second possible implementation manner of the seventh aspect, the processor is specifically configured to: acquire a system message configuration, where the system message configuration includes a configuration of a window length of the system message window and a configuration of a system message period; and determine the configuration information according to the acquired system message configuration.

In a fifth possible implementation manner, with reference to the second possible implementation manner of the seventh aspect, the processor is specifically configured to: acquire coverage enhancement requirement information of the system message, coverage enhancement level information of the system message, repetition times requirement information of the system message, and/or receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

In a sixth possible implementation manner, with reference to the fifth possible implementation manner of the seventh aspect, the processor is specifically configured to: determine a system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message.

In a seventh possible implementation manner, with reference to the fifth possible implementation manner of the seventh aspect, the processor is specifically configured to: determine transmission times of the system message according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, information about a subframe used when the base station device transmits the system message, where the information about the subframe includes at least a location of the subframe.

In the embodiments of the present invention, the following solution is used: Configuration information is determined, where the configuration information is used to indicate a system message transmission configuration in a system message window; and then a system message is sent on a resource indicated by the configuration information, so that a terminal device receives the system message according to the configuration information. In this solution, the terminal device can exactly know the system message transmission configuration in the system message window; therefore, it is helpful for the terminal device to subsequently perform operations such as a receiving and combination operation and a receiving attempt (keep trying) operation, which can reduce processing complexity of the terminal device, and improve a coverage enhancement effect.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

FIG. 1c is another schematic diagram of a configuration in a system message window according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

The embodiments of the present invention provide a network side device, system, and method for a system message. The following separately provides detailed descriptions.

Embodiment 1

Figures 1A, 1B:
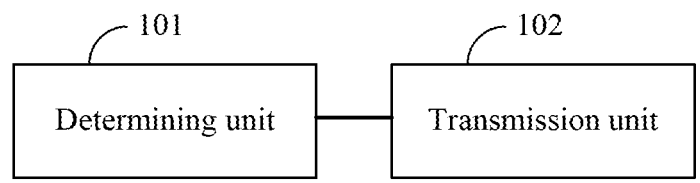
FIG. 1a is a schematic structural diagram of a network side device according to an embodiment of the present invention.
FIG. 1b is a schematic diagram of a configuration in a system message window according to an embodiment of the present invention.

This embodiment of the present invention provides a network side device. As shown in FIG. 1a, the network side device includes a determining unit 101 and a transmission unit 102 as follows:

The determining unit 101 is configured to determine configuration information, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 milliseconds (ms, millisecond), any two available subframes may be selected from 10 subframes in a length of 10 ms (1 ms is also a length of one subframe) to transmit the system message twice. The available subframe refers to a subframe except the following subframes:

(1) a subframe 5 in a radio frame (RF) that meets a condition: system frame number (SFN) mod 2=0, where one radio frame is 10 subframes, that is, 10 ms;

(2) any subframe in a multicast broadcast single frequency network (MBSFN); and (3) any uplink subframe in a time division duplex (TDD) system.

Numbers of subframes that are in the system message window and used for transmission of the system message may be listed in an enumeration manner.

The transmission unit 102 is configured to send the system message on a resource indicated by the configuration information, so that a terminal device receives the system message according to the configuration information.

The configuration information may be known by the terminal device in a manner of agreement between the network side device and the terminal device, or may be notified to the terminal device after being directly determined by the network side device. If the configuration information is known by the terminal device in the manner of agreement between the network side device and the terminal device, the determining unit 101 may be specifically configured to determine the configuration information according to a configuration rule agreed by the network side device and the terminal device.

If a manner of directly notifying the terminal device is used, the network side device may further include a notification unit as follows:

The notification unit is configured to notify the terminal device of the configuration information.

If the system message transmission configuration indicates that the system message is to be transmitted in all available subframes in the system message window, in this case, the system message may be sent in all the available subframes in the system message window. That is, the transmission unit 102 is specifically configured to: when the system message transmission configuration indicates that the system message is to be transmitted in all the available subframes in the system message window, send the system message in all the available subframes in the system message window.

If the system information transmission configuration indicates that the system message is to be transmitted in some subframes in the system message window, in this case, the system message may be sent in these specified subframes. That is, the transmission unit 102 is specifically configured to send the system message in a selected subframe.

When determining the configuration information (that is, the system message transmission configuration in the system message window), the determining unit 101 may use multiple manners, which may be specifically, for example, as follows:

(1) First Manner:

A system message configuration may be first acquired, and then the configuration information is determined according to the system message configuration. That is, the determining unit 101 may be specifically configured to acquire the system message configuration, and determine the configuration information according to the acquired system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by the network side device and the terminal device according to a specific configuration rule, or may be determined by the network side device, and notified to the terminal device. For example, the network side device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame (Radio Frame).

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired (that is, one or more pieces of information such as the coverage enhancement requirement information of the system message, the coverage enhancement level information of the system message, the repetition times requirement information of the system message, and the receiving attempt times requirement information of the terminal device are acquired), and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device. That is, the determining unit 101 may be specifically configured to: acquire the information such as the coverage enhancement requirement information of the system message, the coverage enhancement level information of the system message, the repetition times requirement information of the system message, and/or the receiving attempt times requirement information of the terminal device; and determine the system message transmission configuration in the system message window according to the acquired coverage enhancement requirement information of the system message, the acquired coverage enhancement level information of the system message, the acquired repetition times requirement information of the system message, and/or the acquired receiving attempt times requirement information of the terminal device.

A correspondence between configuration information (that is, a system message transmission configuration) and various requirement information (that is, information such as coverage enhancement requirement information of the system message, coverage enhancement level information of the system message, repetition times requirement information of the system message, and/or receiving attempt times requirement information of the terminal device) may be determined by the network side device and the terminal device according to a specific configuration rule, or may be determined by the network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

The coverage enhancement requirement information of the system message, the coverage enhancement level information of the system message, the repetition times requirement information of the system message, and/or the receiving attempt times requirement information of the terminal device, and the like may be specifically described as follows:

(1) Coverage Enhancement Requirement:

The system message transmission configuration in the system message window may be further related to a coverage enhancement requirement of the system message, and different coverage enhancement requirements may be corresponding to different system message transmission configurations in the system message window. For example, if for a coverage enhancement requirement 1, the system message may need to be transmitted in the system message window twice, two subframes need to be selected from the system message window to transmit the system message; if for a coverage enhancement requirement 2, the system message may need to be transmitted in the system message window for five times, five subframes need to be selected from the system message window to transmit the system message. If the system message has only one coverage enhancement requirement, this item may be omitted or ignored.

(2) Coverage Enhancement Level:

The coverage enhancement level and the coverage enhancement requirement may be in a one-to-one correspondence, and one coverage enhancement requirement is corresponding to one coverage enhancement level, or one coverage enhancement requirement may be corresponding to multiple coverage enhancement levels.

(3) Requirement of Repetition Times:

Signal repetition is one of coverage enhancement technologies. Different signal repetition times may meet different coverage enhancement requirements, and may also be corresponding to different coverage enhancement levels.

(4) Requirement of Receiving Attempt Times of the Terminal Device:

A receiving attempt (keep trying) of the terminal device is also a coverage enhancement technology. Different receiving attempt times of the terminal device may provide different enhancement gains.

As two coverage enhancement technologies, signal repetition (that is, repetition times requirement information) and "a receiving attempt of the terminal device" may be used in combination. Combinations of different repetition times and different receiving attempt times of the terminal device may meet different coverage enhancement requirements.

Specifically, when the system message window is being configured, a coverage enhancement requirement, a coverage enhancement level, a requirement of repetition times, and/or a requirement of receiving attempt times of the terminal device may also be configured in the system message window. For example, as shown in FIG. 1b, the figure is a schematic diagram of a configuration in a system message window. It may be learned that the configuration may include n coverage enhancement requirements, m coverage enhancement levels, x requirements of repetition times, y requirements of receiving attempt times of the terminal device, z system message configurations, and c system message transmission configurations in the system message window, where n, m, x, y, z, and c may be set according to a requirement in an actual application.

Among all fields in FIG. 1b, a field marked as "optional" indicates that the field is an optional item, and may be added or deleted according to a requirement in an actual application.

Optionally, a configuration in the system message window may be shown in FIG. 1c, that is, various combinations of coverage enhancement requirements, coverage enhancement levels, requirements of repetition times, requirements of receiving attempt times of the terminal device, system message configurations, and system message transmission configurations in the system message window are all presented, where # sij refers to a subframe sij.

When determining the configuration information (that is, the system message transmission configuration in the system message window), the determining unit 101 may first determine a system message configuration according to the acquired information such as the coverage enhancement requirement information of the system message, the coverage enhancement level information of the system message, the repetition times requirement information of the system message, and/or the receiving attempt times requirement information of the terminal device, and then determine the configuration information according to the determined system message configuration; or may preset the correspondence between configuration information and information such as coverage enhancement requirement information of the system message, coverage enhancement level information of the system message, repetition times requirement information of the system message, and/or receiving attempt times requirement information of the terminal device, and after acquiring information such as coverage enhancement requirement information of the system message, coverage enhancement level information of the system message, repetition times requirement information of the system message, and/or receiving attempt times requirement information of the terminal device, determine corresponding configuration information by searching the correspondence; or may acquire a system message configuration, and determine the configuration information according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, the determining unit 101 may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message configuration; or the determining unit 101 may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or the determining unit 101 may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The determining unit 101 may be specifically configured to: determine the transmission times of the system message (that is, total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, the information about the subframe used when the system message is transmitted.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to transmit the system message, where N is the transmission times of the system message in the system message window, and N is an integer greater than 0. That is, the determining unit 101 may be specifically configured to: when the window length (that is, the window length of the system message window) is sufficient to transmit N system messages, select a subframe from the system message window to transmit the system message; or when the window length is not sufficient to transmit N system messages, extend the system message window, and select a subframe from the extended system message window to transmit the system message.

Certainly, when the window length (that is, the window length of the system message window) is sufficient to transmit N system messages, the determining unit 101 may also extend the system message window, and select a subframe from the extended system message window to transmit the system message.

Optionally, the system message window may not be extended, and instead, a subframe is selected from multiple consecutive system message windows to transmit the system message. That is, the determining unit 101 may be specifically configured to select, according to the window length and the transmission times, a subframe from the multiple consecutive system message windows of the determining unit to transmit the system message.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, details may be as follows:

The determining unit 101 is specifically configured to: acquire the system message period; determine whether the system message period exceeds a preset period threshold; and if the period exceeds the period threshold, when it is determined that the window length is sufficient to transmit N system messages, select a subframe from the system message window to transmit the system message, or extend the system message window, and select a subframe from the extended system message window to transmit the system message, or when the window length is not sufficient to transmit N system messages (N is the transmission times of the system message), extend the system message window, and select a subframe from the extended system message window to transmit the system message; or if the period does not exceed the period threshold, select, according to the window length and the transmission times, a subframe from the multiple consecutive system message windows to transmit the system message.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, the determining unit 101 may be specifically configured to: determine the receiving attempt times of the terminal device according to the receiving attempt times requirement information of the terminal device, and when it is determined that the receiving attempt times are greater than a preset threshold, extend the system message window; and select, according to the window length of the system message window and the transmission times of the system message in the system message window, a subframe from the extended system message window to transmit the system message.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

The network side device may be specifically integrated into a device such as a base station device.

During specific implementation, the foregoing units may be implemented as independent entities, or may be randomly combined and implemented as one entity or several entities. Specific implementation of the foregoing units is further described in detail in the following embodiments.

In addition, it should be further noted that for ease of description and processing, in the present invention, a SIB1 is regarded as a special system message. For the SIB1, a length of a system message window is 1, and a period of the system message window is 80 ms. Therefore, descriptions of a system message that are in this embodiment of the present invention are also applicable to a case of the SIB1.

It may be learned from the foregoing that a determining unit 101 in this embodiment may determine configuration information, where the configuration information is used to indicate a system message transmission configuration in a system message window; and then a transmission unit 102 sends a system message on a resource indicated by the configuration information, so that a terminal device receives the system message according to the configuration information. In this solution, the terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

Embodiment 2

Figure 2:
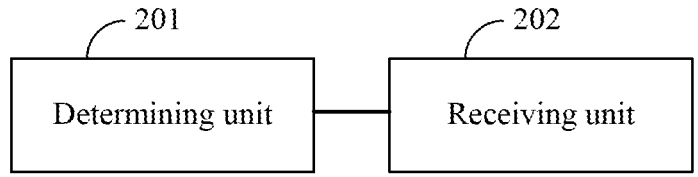
FIG. 2 is a schematic structural diagram of a terminal device according to an embodiment of the present invention.

Correspondingly, this embodiment of the present invention provides a terminal device. As shown in FIG. 2, the terminal device includes a determining unit 201 and a receiving unit 202 as follows:

The determining unit 201 is configured to determine configuration information, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 ms, any two available subframes may be selected from 10 subframes in a length of 10 ms (1 ms is also a length of one subframe) to transmit the system message twice.

Numbers of subframes that are in the system message window and used for transmission of the system message may be listed in an enumeration manner.

The receiving unit 202 is configured to receive, on a resource indicated by the configuration information, the system message sent by a base station device.

The configuration information may be obtained in a manner of agreement between the terminal device and the base station device, or may be directly notified to the terminal device after being determined by the base station device. That is, the determining unit 201 may be specifically configured to determine the configuration information according to a configuration rule agreed by the terminal device and the base station device; or the receiving unit 202 may be further configured to: before the configuration information is determined, receive a notification that is about the configuration information and sent by the base station device; and in this case, the determining unit 201 may be specifically configured to determine the configuration information according to the notification (that is, the notification about the configuration information) received by the receiving unit 202.

If the system message transmission configuration indicates that the system message is to be transmitted in all available subframes in the system message window, in this case, it indicates that the base station device sends the system message in all the available subframes in the system message window. Therefore, the system message sent by the base station device may be received in all the available subframes in the system message window. That is, the receiving unit 202 may be specifically configured to: when the system message transmission configuration indicates that the system message is to be transmitted in all the available subframes in the system message window, receive, in all the available subframes in the system message window, the system message sent by the base station device.

If the system transmission configuration indicates that the system message is to be transmitted in some subframes in the system message window, in this case, the system message sent by the base station device may be received in these specified subframes. That is, the receiving unit 202 may be specifically configured to receive, in a selected subframe, the system message sent by the base station device.

If the configuration information is determined according to the configuration rule agreed by the terminal device and the base station device, a determining manner used by the terminal device should keep consistent with a manner used by the base station device. When determining the configuration information (that is, the system message transmission configuration in the system message window), the determining unit 201 may use either of the following manners (only provided that the manner keeps consistent with a manner used by the base station device), which may be specifically, for example, as follows:

(1) First Manner:

A system message configuration may be first acquired, and then the configuration information is determined according to the system message configuration. That is, the determining unit 201 is specifically configured to acquire the system message configuration, and determine the configuration information according to the acquired system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by the base station device and the terminal device according to a specific configuration rule, or may be determined by a network side device, and notified to the terminal device. For example, the base station device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame (Radio Frame).

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device. That is, the determining unit 201 may be specifically configured to: acquire the information such as the coverage enhancement requirement information of the system message, the coverage enhancement level information of the system message, the repetition times requirement information of the system message, and/or the receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by a base station device and the terminal device according to a specific configuration rule, or may be determined by a network side device, and notified to the terminal device. For example, the base station device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to Embodiment 1, and details are not described herein again.

As two coverage enhancement technologies, signal repetition and "a receiving attempt of the terminal device" may be used in combination. Combinations of different repetition times and different receiving attempt times of the terminal device may meet different coverage enhancement requirements.

Specifically, when the system message window is being configured, a coverage enhancement requirement, a coverage enhancement level, a requirement of repetition times, and/or a requirement of receiving attempt times of the terminal device may also be configured in the system message window. For example, as shown in FIG. 1b, the figure is a schematic diagram of a configuration in a system message window. It may be learned that the configuration may include n coverage enhancement requirements, m coverage enhancement levels, x requirements of repetition times, y requirements of receiving attempt times of the terminal device, z system message configurations, and c system message transmission configurations in the system message window, where n, m, x, y, z, and c may be set according to a requirement in an actual application.

Among all fields in FIG. 1b, a field marked as "optional" indicates that the field is an optional item, and may be added or deleted according to a requirement in an actual application.

Optionally, a configuration in the system message window may be shown in FIG. 1c, that is, various combinations of coverage enhancement requirements, coverage enhancement levels, requirements of repetition times, requirements of receiving attempt times of the terminal device, system message configurations, and system message transmission configurations in the system message window are all presented, where # sij refers to a subframe sij.

When determining the configuration information (that is, the system message transmission configuration in the system message window), the determining unit 201 may first determine a system message configuration according to the acquired information such as the coverage enhancement requirement information of the system message, the coverage enhancement level information of the system message, the repetition times requirement information of the system message, and/or the receiving attempt times requirement information of the terminal device, and then determine the configuration information (that is, the system message transmission configuration in the system message window) according to the determined system message configuration; or may preset the correspondence between the configuration information and information such as coverage enhancement requirement information of the system message, coverage enhancement level information of the system message, repetition times requirement information of the system message, and/or receiving attempt times requirement information of the terminal device, and after acquiring information such as coverage enhancement requirement information of the system message, coverage enhancement level information of the system message, repetition times requirement information of the system message, and/or receiving attempt times requirement information of the terminal device, determine corresponding configuration information by searching the correspondence; or may acquire a system message configuration, and determine the configuration information according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, the determining unit 201 may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message; or the determining unit 201 may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or the determining unit 201 may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The determining unit 201 may be specifically configured to: determine the transmission times of the system message (that is, total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, the information about the subframe used when the base station device transmits the system message.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to receive the system message sent by the base station device, where N is the transmission times of the system message in the system message window, and N is an integer greater than 0. That is, the determining unit 201 may be specifically configured to: when the window length is sufficient to transmit N system messages, select a subframe from the system message window to receive the system message sent by the base station device, where N is the transmission times of the system message; or when the window length is not sufficient to transmit N system messages, extend the system message window, and select a subframe from the extended system message window to receive the system message sent by the base station device.

Certainly, when the window length (that is, the window length of the system message window) is sufficient to transmit N system messages, the determining unit 201 may also extend the system message window, and select a subframe from the extended system message window to receive the system message sent by the base station device.

Optionally, the system message window may not be extended, and instead, a subframe is selected from multiple consecutive system message windows to receive the system information sent by the base station device. That is, the determining unit 201 may be specifically configured to select, according to the window length and the transmission times, a subframe from the multiple consecutive system message windows to receive the system message sent by the base station device.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, the determining unit 201 may be specifically configured to: acquire the system message period; determine whether the system message period exceeds a preset period threshold; and if the period exceeds the period threshold, when it is determined that the window length is sufficient to transmit N system messages, select a subframe from the system message window to receive the system message sent by the base station device, or extend the system message window, and select a subframe from the extended system message window to receive the system message sent by the base station device, or when the window length is not sufficient to transmit N system messages, extend the system message window, and select a subframe from the extended system message window to receive the system message sent by the base station device; or if the period does not exceed the period threshold, select, according to the window length and the transmission times, a subframe from the multiple consecutive system message windows to receive the system message sent by the base station device.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, the determining unit 201 is specifically configured to: determine the receiving attempt times of the terminal device according to the receiving attempt times requirement information of the terminal device, and when it is determined that the receiving attempt times are greater than a preset threshold, extend the system message window; and select, according to the window length and the transmission times, a subframe from the extended system message window to receive the system message sent by the base station device.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

The terminal device may be specifically a device such as a mobile phone, a tablet computer, or a personal computer.

During specific implementation, the foregoing units may be implemented as independent entities, or may be randomly combined and implemented as one entity or several entities. Specific implementation of the foregoing units is further described in detail in the following embodiments.

It may be learned from the foregoing that a determining unit 201 in this embodiment may determine configuration information, where the configuration information is used to indicate a system message transmission configuration in a system message window; and then a receiving unit 202 receives, on a resource indicated by the configuration information, a system message sent by a base station device. In this solution, the terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

Embodiment 3

Correspondingly, this embodiment of the present invention further provides a communications system, including any network side device and any terminal device provided in embodiments of the present invention. For details, reference may be made to the foregoing embodiments. For example, the network side device is specifically a base station device. Details may be as follows:

The base station device is configured to: determine configuration information, where the configuration information is used to indicate a system message transmission configuration in a system message window; and send a system message on a resource indicated by the configuration information.

The terminal device is configured to: determine the configuration information, where the configuration information is used to indicate the system message transmission configuration in the system message window; and receive, on the resource indicated by the configuration information, the system message sent by the base station device.

The configuration information may be agreed by the base station device and the terminal device in advance, or may be directly notified to the terminal device after being configured by the base station. That is, the base station device may be specifically configured to determine the configuration information according to a configuration rule agreed by the base station device and the terminal device; and in this case, the terminal device may be configured to determine the configuration information according to the configuration rule agreed by the terminal device and the base station device; or the base station device may be further configured to: after determining the configuration information, notify the terminal device of the configuration information; and in this case, the terminal device may be further configured to: receive a notification that is about the configuration information and sent by the base station device, and determine the configuration information according to the notification.

If the system message transmission configuration indicates that the system message is to be transmitted in all available subframes in the system message window, in this case, the system message may be sent in all the available subframes in the system message window. That is, the base station device may be specifically configured to: when the system message transmission configuration indicates that the system message is to be transmitted in all the available subframes in the system message window, send the system message in all the available subframes in the system message window.

In this case, the terminal device may be specifically configured to: when the system message transmission configuration indicates that the system message is to be transmitted in all the available subframes in the system message window, receive, in all the available subframes in the system message window, the system message sent by the base station device.

When the configuration information (that is, the system message transmission configuration in the system message window) is being determined, multiple manners may be used, which may be specifically, for example, as follows:

(1) First Manner:

A system message configuration may be first acquired, and then the configuration information is determined according to the system message configuration. That is, the base station device may be specifically configured to acquire the system message configuration, and determine the configuration information according to the acquired system message configuration.

In this case, the terminal device may be specifically configured to acquire the system message configuration, and determine the configuration information according to the acquired system message configuration.

The foregoing correspondence between a system message configuration and configuration information (that is, a system message transmission configuration) may be determined by the base station device and the terminal device according to a specific configuration rule, or may be determined by the base station device, and notified to the terminal device. For example, the base station device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame (Radio Frame).

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device. That is, the base station device may be specifically configured to: acquire the information such as the coverage enhancement requirement information of the system message, the coverage enhancement level information of the system message, the repetition times requirement information of the system message, and/or the receiving attempt times requirement information of the terminal device; and determine the system message transmission configuration in the system message window according to the acquired coverage enhancement requirement information of the system message, the acquired coverage enhancement level information of the system message, the acquired repetition times requirement information of the system message, and/or the acquired receiving attempt times requirement information of the terminal device.

In this case, the terminal device may be specifically configured to: acquire the information such as the coverage enhancement requirement information of the system message, the coverage enhancement level information of the system message, the repetition times requirement information of the system message, and/or the receiving attempt times requirement information of the terminal device; and determine the system message transmission configuration in the system message window according to the acquired coverage enhancement requirement information of the system message, the acquired coverage enhancement level information of the system message, the acquired repetition times requirement information of the system message, and/or the acquired receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by the network side device and the terminal device according to a specific configuration rule, or may be determined by the network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to the foregoing embodiments, and details are not described herein again.

As two coverage enhancement technologies, signal repetition and "a receiving attempt of the terminal device" may be used in combination. Combinations of different repetition times and different receiving attempt times of the terminal device may meet different coverage enhancement requirements.

Specifically, when the system message window is being configured, a coverage enhancement requirement, a coverage enhancement level, a requirement of repetition times, and/or a requirement of receiving attempt times of the terminal device may also be configured in the system message window. Reference may be made to FIG. 1b, and details are not described herein again.

Optionally, a configuration in the system message window may be shown in FIG. 1c, that is, various combinations of coverage enhancement requirements, coverage enhancement levels, requirements of repetition times, requirements of receiving attempt times of the terminal device, system message configurations, and system message transmission configurations in the system message window are all presented, where # sij refers to a subframe sij.

When the configuration information (that is, the system message transmission configuration in the system message window) is being determined, a system message configuration may be first determined according to the acquired information such as the coverage enhancement requirement information of the system message, the coverage enhancement level information of the system message, the repetition times requirement information of the system message, and/or the receiving attempt times requirement information of the terminal device, and then the configuration information is determined according to the determined system message configuration; or the correspondence between the configuration information and information such as coverage enhancement requirement information of the system message, coverage enhancement level information of the system message, repetition times requirement information of the system message, and/or receiving attempt times requirement information of the terminal device may be preset, and after information such as coverage enhancement requirement information of the system message, coverage enhancement level information of the system message, repetition times requirement information of the system message, and/or receiving attempt times requirement information of the terminal device is acquired, corresponding configuration information is determined by searching the correspondence; or a system message configuration may be acquired, and the configuration information is determined according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, the base station device may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message configuration.

In this case, the terminal device may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message configuration.

Alternatively, the base station device may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device.

In this case, the terminal device may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device.

Alternatively, the base station device may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The base station device determines transmission times of the system message (that is, total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device, acquires a window length of the system message window, and determines, according to the window length and the transmission times, information about a subframe used when the system message is transmitted.

In this case, the terminal device may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The terminal device determines the transmission times of the system message (that is, the total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device, acquires the window length of the system message window, and determines, according to the window length and the transmission times, the information about the subframe used when the system message is transmitted.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to transmit the system message, where N is the transmission times of the system message in the system message window, and N is an integer greater than 0. That is, the base station device may be specifically configured to: when the window length (that is, the window length of the system message window) is sufficient to transmit N system messages, select a subframe from the system message window to transmit the system message, or extend the system message window, and select a subframe from the extended system message window to transmit the system message; or when the window length is not sufficient to transmit N system messages, extend the system message window, and select a subframe from the extended system message window to transmit the system message.

In this case, the terminal device may be specifically configured to: when the window length (that is, the window length of the system message window) is sufficient to transmit N system messages, select a subframe from the system message window to receive the system message sent by the base station device, or extend the system message window, and select a subframe from the extended system message window to receive the system message sent by the base station device; or when the window length is not sufficient to transmit N system messages, extend the system message window, and select a subframe from the extended system message window to receive the system message sent by the base station device.

Optionally, the system message window may not be extended, and instead, a subframe is selected from multiple consecutive system message windows to transmit the system message. That is, the base station device may be specifically configured to select, according to the window length and the transmission times, a subframe from the multiple consecutive system message windows of the determining unit to transmit the system message.

In this case, the terminal device may be specifically configured to select, according to the window length and the transmission times, a subframe from the multiple consecutive system message windows of the determining unit to receive the system message sent by the base station device.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. Details may be as follows:

The base station device may be specifically configured to: acquire the system message period; determine whether the system message period exceeds a preset period threshold; and if the period exceeds the period threshold, when it is determined that the window length is sufficient to transmit N system messages, select a subframe from the system message window to transmit the system message, or extend the system message window, and select a subframe from the extended system message window to transmit the system message, or when the window length is not sufficient to transmit N system messages (N is the transmission times of the system message), extend the system message window, and select a subframe from the extended system message window to transmit the system message; or if the period does not exceed the period threshold, select, according to the window length and the transmission times, a subframe from the multiple consecutive system message windows to transmit the system message.

In this case, the terminal device may be specifically configured to: acquire the system message period; determine whether the system message period exceeds the preset period threshold; and if the period exceeds the period threshold, when it is determined that the window length is sufficient to transmit N system messages, select a subframe from the system message window to receive the system message sent by the base station device, or extend the system message window, and select a subframe from the extended system message window to receive the system message sent by the base station device, or when the window length is not sufficient to transmit N system messages (N is the transmission times of the system message), extend the system message window, and select a subframe from the extended system message window to receive the system message sent by the base station device; or if the period does not exceed the period threshold, select, according to the window length and the transmission times, a subframe from the multiple consecutive system message windows to receive the system information sent by the base station device.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, the base station device may be specifically configured to: determine the receiving attempt times of the terminal device according to the receiving attempt times requirement information of the terminal device, and when it is determined that the receiving attempt times are greater than a preset threshold, extend the system message window; and select, according to the window length of the system message window and the transmission times of the system message in the system message window, a subframe from the extended system message window to transmit the system message.

In this case, the terminal device may be specifically configured to: determine the receiving attempt times of the terminal device according to the receiving attempt times requirement information of the terminal device, and when it is determined that the receiving attempt times are greater than the preset threshold, extend the system message window; and select, according to the window length of the system message window and the transmission times of the system message in the system message window, a subframe from the extended system message window to receive the system message sent by the base station device.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

In addition, the communications system may further include another device, and details are not described herein again.

Specific implementation of the communications system is further described in detail in the following other embodiments.

It may be learned from the foregoing that the communications system in this embodiment uses the following solution: Configuration information is determined, where the configuration information is used to indicate a system message transmission configuration in a system message window; and then a system message is transmitted on a resource indicated by the configuration information. In this solution, a terminal device can exactly know a system message configuration and the system message transmission configuration that is in the system message window in a manner of notification or agreement between a network side device and the terminal device; therefore, it is helpful for the terminal device to subsequently perform operations such as a receiving and combination operation and a receiving attempt operation, which can reduce processing complexity of the terminal device, and improve a coverage enhancement effect.

In addition, embodiments of the present invention further provide a corresponding coverage enhancement transmission method for a system message. The following separately describes the coverage enhancement transmission method for a system message from perspectives of a network side device and a terminal device in Embodiment 4 and Embodiment 5.

Embodiment 4

This embodiment provides a description from a perspective of a network side device, and the network side device may be specifically integrated into a device such as a base station device.

A coverage enhancement transmission method for a system message is provided, including: determining configuration information, where the configuration information is used to indicate a system message transmission configuration in a system message window; and sending a system message on a resource indicated by the configuration information, so that a terminal device receives the system message according to the configuration information.

Figure 3:
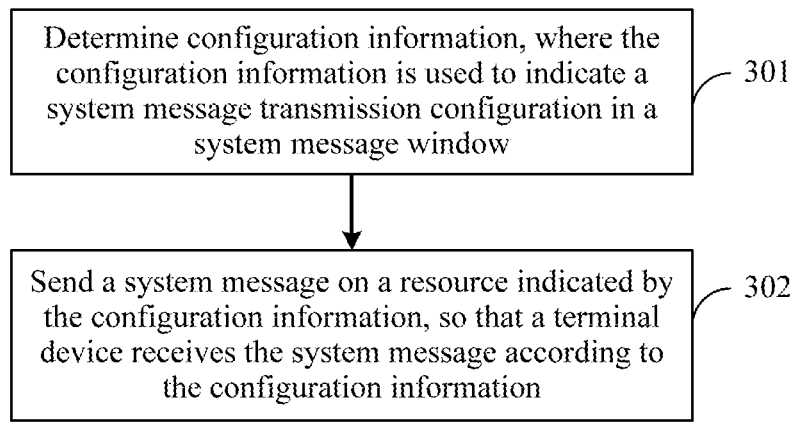
FIG. 3 is a flowchart of a coverage enhancement transmission method for a system message according to an embodiment of the present invention.

As shown in FIG. 3, a specific procedure may be as follows:

301. Determine configuration information, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 milliseconds (ms, millisecond), any two available subframes may be selected from 10 subframes in a length of 10 ms (1 ms is also a length of one subframe) to transmit the system message twice.

Numbers of subframes that are in the system message window and used for transmission of the system message may be listed in an enumeration manner.

The configuration information may be known by the terminal device in a manner of agreement between a network side device and the terminal device, or may be notified to the terminal device after being directly determined by a network side device. If the configuration information is known by the terminal device in the manner of agreement between the network side device and the terminal device, the step "determining configuration information (in step 301)" may specifically include:

determining the configuration information according to a configuration rule agreed by the network side device and the terminal device.

If the configuration information is notified to the terminal device after being directly determined by the network side device, after the step "determining configuration information (in step 301)", the method may further include:

notifying the terminal device of the configuration information.

When the configuration information (that is, the system message transmission configuration in the system message window) is being determined, multiple manners may be used, which may be specifically, for example, as follows:

(1) First Manner:

A system message configuration may be first acquired, and then the configuration information is determined according to the system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by the network side device and the terminal device according to a specific configuration rule, or may be determined by the network side device, and notified to the terminal device. For example, the network side device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame.

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by the network side device and the terminal device according to a specific configuration rule, or may be determined by the network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to the foregoing embodiments, and details are not described herein again.

Specifically, when the system message window is being configured, a coverage enhancement requirement, a coverage enhancement level, a requirement of repetition times, and/or a requirement of receiving attempt times of the terminal device may also be configured in the system message window. For example, reference may be made to FIG. 1b, and details are not described herein again.

Optionally, a configuration in the system message window may be shown in FIG. 1c, that is, various combinations of coverage enhancement requirements, coverage enhancement levels, requirements of repetition times, requirements of receiving attempt times of the terminal device, system message configurations, and system message transmission configurations in the system message window are all presented, where # sij refers to a subframe sij.

When the configuration information (that is, the system message transmission configuration in the system message window) is being determined, a system message configuration may be first determined according to the acquired information such as the coverage enhancement requirement information of the system message, the coverage enhancement level information of the system message, the repetition times requirement information of the system message, and/or the receiving attempt times requirement information of the terminal device, and then the configuration information is determined according to the determined system message configuration; or the correspondence between the configuration information and information such as coverage enhancement requirement information of the system message, coverage enhancement level information of the system message, repetition times requirement information of the system message, and/or receiving attempt times requirement information of the terminal device may be preset, and after information such as coverage enhancement requirement information of the system message, coverage enhancement level information of the system message, repetition times requirement information of the system message, and/or receiving attempt times requirement information of the terminal device is acquired, corresponding configuration information is determined by searching the correspondence; or a system message configuration may be acquired, and the configuration information is determined according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, a step "determining the configuration information according to the acquired coverage enhancement requirement information of the system message, the acquired coverage enhancement level information of the system message, the acquired repetition times requirement information of the system message, and/or the acquired receiving attempt times requirement information of the terminal device" may specifically include:

determining the system message configuration according to the acquired coverage enhancement requirement information of the system message, the acquired coverage enhancement level information of the system message, the acquired repetition times requirement information of the system message, and/or the acquired receiving attempt times requirement information of the terminal device, and determining the configuration information according to the determined system message configuration; or acquiring the system message configuration in addition to the information such as the coverage enhancement requirement information of the system message, the coverage enhancement level information of the system message, the repetition times requirement information of the system message, and/or the receiving attempt times requirement information of the terminal device; and then determining the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or directly determining the configuration information according to the acquired information such as the coverage enhancement requirement information of the system message, the coverage enhancement level information of the system message, the repetition times requirement information of the system message, and/or the receiving attempt times requirement information of the terminal device, which may be specifically, for example, as follows:

determining the transmission times of the system message according to the acquired coverage enhancement requirement information of the system message, the acquired coverage enhancement level information of the system message, the acquired repetition times requirement information of the system message, and/or the acquired receiving attempt times requirement information of the terminal device, acquiring a window length of the system message window, and determining, according to the window length and the transmission times, the information about the subframe used when the system message is transmitted.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to transmit the system message, where N is the transmission times of the system message in the system message window, and N is an integer greater than 0. That is, the step "determining, according to the window length and the transmission times, the information about the subframe used when the system message is transmitted" may specifically include:

if the window length is sufficient to transmit N system messages, selecting a subframe from the system message window to transmit the system message, or extending the system message window, and selecting a subframe from the extended system message window to transmit the system message; or if the window length is not sufficient to transmit N system messages, extending the system message window, and selecting a subframe from the extended system message window to transmit the system message.

Optionally, the system message window may not be extended, and instead, a subframe is selected from multiple consecutive system message windows to transmit the system message, that is, the step "determining, according to the window length and the transmission times, the information about the subframe used when the system message is transmitted is determined" may specifically include:

selecting, according to the window length and the transmission times, a subframe from the multiple consecutive system message windows to transmit the system message.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, the coverage enhancement transmission method for a system message may further include:

acquiring the system message period.

In this case, the step "determining, according to the window length and the transmission times, the information about the subframe used when the system message is transmitted" may specifically include:

determining whether the system message period exceeds a preset period threshold; and if the period exceeds the period threshold, when it is determined that the window length is sufficient to transmit N system messages, selecting a subframe from the system message window to transmit the system message, or extending the system message window, and selecting a subframe from the extended system message window to transmit the system message; or when the window length is not sufficient to transmit N system messages, extending the system message window, and selecting a subframe from the extended system message window to transmit the system message; or if the period does not exceed the period threshold, selecting, according to the window length and the transmission times, a subframe from the multiple consecutive system message windows to transmit the system message.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, before the step "determining, according to the window length and the transmission times, the information about the subframe used when the system message is transmitted", the coverage enhancement transmission method for a system message may further include:

determining the receiving attempt times of the terminal device according to the receiving attempt times requirement information of the terminal device, and when it is determined that the receiving attempt times are greater than a preset threshold, extending the system message window.

The step "determining, according to the window length and the transmission time, the information about the subframe used when the system message is transmitted" is specifically:

selecting, according to the window length and the transmission times, a subframe from the extended system message window to transmit the system message.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

302. Send a system message on a resource indicated by the configuration information, so that a terminal device receives the system message according to the configuration information.

If the system message transmission configuration indicates that the system message is to be transmitted in all available subframes in the system message window, in this case, the system message may be sent in all the available subframes in the system message window. That is, the step "sending a system message on a resource indicated by the configuration information" may be specifically:

sending the system message in all the available subframes in the system message window.

If the system transmission configuration indicates that the system message is to be transmitted in some subframes in the system message window, in this case, the system message may be sent in these specified subframes. That is, the step "sending a system message on a resource indicated by the configuration information" may be specifically:

sending the system message in a selected subframe.

It may be learned from the foregoing that, in this embodiment, the following solution is used: Configuration information is determined, where the configuration information is used to indicate a system message transmission configuration in a system message window; and then a system message is sent on a resource indicated by the configuration information, so that a terminal device receives the system message according to the configuration information. In this solution, the terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

Embodiment 5

This embodiment provides a description from a perspective of a terminal device, and the terminal device may be specifically a device such as a mobile phone, a tablet computer, or a personal computer.

A coverage enhancement transmission method for a system message is provided, including: determining configuration information, where the configuration information is used to indicate a system message transmission configuration in a system message window; and receiving, on a resource indicated by the configuration information, a system message sent by a base station device.

Figure 4:
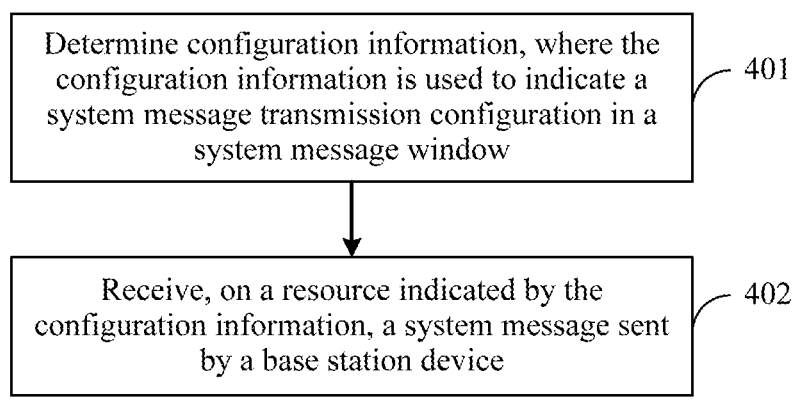
FIG. 4 is another flowchart of a coverage enhancement transmission method for a system message according to an embodiment of the present invention.

As shown in FIG. 4, a specific procedure may be as follows:

401. Determine configuration information, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 milliseconds (ms, millisecond), any two available subframes may be selected from 10 subframes in a length of 10 ms (1 ms is also a length of one subframe) to transmit the system message twice.

Numbers of subframes that are in the system message window and used for transmission of the system message may be listed in an enumeration manner.

The configuration information may be obtained in a manner of agreement between a terminal device and a base station device, or may be directly notified to a terminal device after being determined by a base station device. That is, the step "determining configuration information" may be specifically:

determining the configuration information according to a configuration rule agreed by the terminal device and the base station device.

Alternatively, before the step "determining configuration information", the coverage enhancement transmission method for a system message may further include:

receiving a notification that is about the configuration information and sent by the base station device.

In this case, the step "determining configuration information" may be specifically: determining the configuration information according to the received notification (that is, the notification about the configuration information).

When the configuration information (that is, the system message transmission configuration in the system message window) is being determined, multiple manners may be used, which may be specifically, for example, as follows:

(1) First Manner:

A system message configuration may be first acquired, and then the configuration information is determined according to the system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by a network side device and the terminal device according to a specific configuration rule, or may be determined by a network side device, and notified to the terminal device. For example, the network side device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame.

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by a network side device and the terminal device according to a specific configuration rule, or may be determined by a network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to the foregoing embodiments, and details are not described herein again.

Specifically, when the system message window is being configured, a coverage enhancement requirement, a coverage enhancement level, a requirement of repetition times, and/or a requirement of receiving attempt times of the terminal device may also be configured in the system message window. For example, reference may be made to FIG. 1b, and details are not described herein again.

Optionally, a configuration in the system message window may be shown in FIG. 1c, that is, various combinations of coverage enhancement requirements, coverage enhancement levels, requirements of repetition times, requirements of receiving attempt times of the terminal device, system message configurations, and system message transmission configurations in the system message window are all presented, where # sij refers to a subframe sij.

When the configuration information (that is, the system message transmission configuration in the system message window) is being determined, a system message configuration may be first determined according to the acquired information such as the coverage enhancement requirement information of the system message, the coverage enhancement level information of the system message, the repetition times requirement information of the system message, and/or the receiving attempt times requirement information of the terminal device, and then the configuration information is determined according to the determined system message configuration; or the correspondence between the configuration information and information such as coverage enhancement requirement information of the system message, coverage enhancement level information of the system message, repetition times requirement information of the system message, and/or receiving attempt times requirement information of the terminal device may be preset, and after information such as coverage enhancement requirement information of the system message, coverage enhancement level information of the system message, repetition times requirement information of the system message, and/or receiving attempt times requirement information of the terminal device is acquired, corresponding configuration information is determined by searching the correspondence; or a system message configuration may be acquired, and the configuration information is determined according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, a step "determining the configuration information according to the acquired coverage enhancement requirement information of the system message, the acquired coverage enhancement level information of the system message, the acquired repetition times requirement information of the system message, and/or the acquired receiving attempt times requirement information of the terminal device" may specifically include:

determining the system message configuration according to the acquired coverage enhancement requirement information of the system message, the acquired coverage enhancement level information of the system message, the acquired repetition times requirement information of the system message, and/or the acquired receiving attempt times requirement information of the terminal device, and determining the configuration information according to the determined system message configuration; or acquiring the system message configuration in addition to the information such as the coverage enhancement requirement information of the system message, the coverage enhancement level information of the system message, the repetition times requirement information of the system message, and/or the receiving attempt times requirement information of the terminal device; and then determining the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or directly determining the configuration information according to the acquired information such as the coverage enhancement requirement information of the system message, the coverage enhancement level information of the system message, the repetition times requirement information of the system message, and/or the receiving attempt times requirement information of the terminal device, which may be specifically, for example, as follows:

determining the transmission times of the system message according to the acquired coverage enhancement requirement information of the system message, the acquired coverage enhancement level information of the system message, the acquired repetition times requirement information of the system message, and/or the acquired receiving attempt times requirement information of the terminal device, acquiring a window length of the system message window, and determining, according to the window length and the transmission times, the information about the subframe used when the system message is transmitted.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to receive the system message sent by the base station device, where N is the transmission times of the system message in the system message window, and N is an integer greater than 0. That is, the step "determining, according to the window length and the transmission times, the information about the subframe used when the system message is transmitted" may specifically include:

if the window length is sufficient to transmit N system messages, selecting a subframe from the system message window to transmit the system message, or extending the system message window, and selecting a subframe from the extended system message window to receive the system message sent by the base station device; or if the window length is not sufficient to transmit N system messages, extending the system message window, and selecting a subframe from the extended system message window to receive the system message sent by the base station device.

Optionally, the system message window may not be extended, and instead, a subframe is selected from multiple consecutive system message windows to receive the system information sent by the base station device, that is, the step "determining, according to the window length and the transmission times, the information about the subframe used when the system message is transmitted" may specifically include:

selecting, according to the window length and the transmission times, a subframe from the multiple consecutive system message windows to receive the system message sent by the base station device.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, the coverage enhancement transmission method for a system message may further include:

acquiring the system message period.

In this case, the step "determining, according to the window length and the transmission times, the information about the subframe used when the system message is transmitted" may specifically include:

determining whether the system message period exceeds a preset period threshold; and if the period exceeds the period threshold, when it is determined that the window length is sufficient to transmit N system messages, selecting a subframe from the system message window to receive the system message sent by the base station device, or extending the system message window, and selecting a subframe from the extended system message window to receive the system message sent by the base station device; or when the window length is not sufficient to transmit N system messages, extending the system message window, and selecting a subframe from the extended system message window to receive the system message sent by the base station device; or if the period does not exceed the period threshold, selecting, according to the window length and the transmission times, a subframe from the multiple consecutive system message windows to receive the system message sent by the base station device.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, before the step "determining, according to the window length and the transmission times, the information about the subframe used when the system message is transmitted", the coverage enhancement transmission method for a system message may further include:

determining the receiving attempt times of the terminal device according to the receiving attempt times requirement information of the terminal device, and when it is determined that the receiving attempt times are greater than a preset threshold, extending the system message window.

The step "determining, according to the window length and the transmission times, the information about the subframe used when the system message is transmitted" is specifically:

selecting, according to the window length and the transmission times, a subframe from the extended system message window to receive the system message sent by the base station device.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

402. Receive, on a resource indicated by the configuration information, a system message sent by a base station device.

If the system message transmission configuration indicates that the system message is to be transmitted in all available subframes in the system message window, in this case, the system message sent by the base station device may be received in all the available subframes in the system message window. That is, the step "receiving, on a resource indicated by the configuration information, a system message sent by a base station device" may be specifically:

receiving, in all the available subframes in the system message window, the system message sent by the base station device.

If the system transmission configuration indicates that the system message is to be transmitted in some subframes in the system message window, in this case, the system message sent by the base station device may be received in these specified subframes. That is, the step "receiving, on a resource indicated by the configuration information, a system message sent by a base station device" may be specifically:

receiving, in a selected subframe, the system message sent by the base station device.

It may be learned from the foregoing that, in this embodiment, the following solution is used: Configuration information is determined, where the configuration information is used to indicate a system message transmission configuration in a system message window; and then a system message sent by a base station device is received on a resource indicated by the configuration information. In this solution, a terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

Embodiment 6

According to the methods described in Embodiment 4 and Embodiment 5, the following further describes in detail the coverage enhancement transmission method for a system message by using an example in which a network side device is specifically integrated into a base station device.

Figure 5:
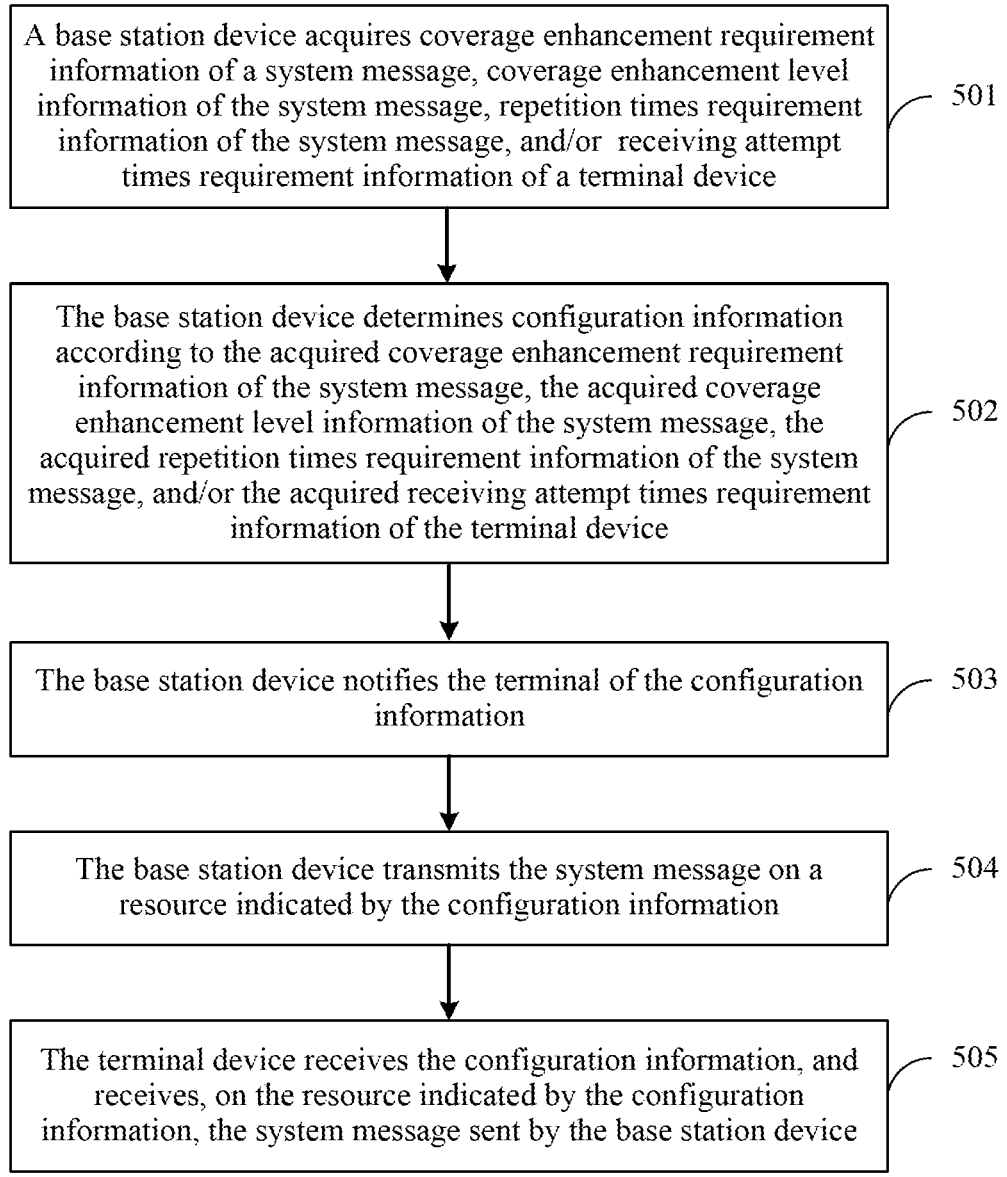
FIG. 5 is still another flowchart of a coverage enhancement transmission method for a system message according to an embodiment of the present invention.

As shown in FIG. 5, a coverage enhancement transmission method for a system message is provided, and a specific procedure may be as follows:

501. A base station device acquires coverage enhancement requirement information of a system message, coverage enhancement level information of the system message, repetition times requirement information of the system message, and/or receiving attempt times requirement information of a terminal device.

502. The base station device determines configuration information according to the acquired coverage enhancement requirement information of the system message, the acquired coverage enhancement level information of the system message, the acquired repetition times requirement information of the system message, and/or the acquired receiving attempt times requirement information of the terminal device, where the configuration information indicates a system message transmission configuration in a system message window.

When the configuration information (that is, the system message transmission configuration in the system message window) is being determined, a system message configuration may be first determined according to acquired information such as the coverage enhancement requirement information of the system message, the coverage enhancement level information of the system message, the repetition times requirement information of the system message, and/or the receiving attempt times requirement information of the terminal device, and then the configuration information is determined according to the determined system message configuration; or a correspondence between the configuration information and information such as coverage enhancement requirement information of the system message, coverage enhancement level information of the system message, repetition times requirement information of the system message, and/or receiving attempt times requirement information of the terminal device may be preset, and after information such as coverage enhancement requirement information of the system message, coverage enhancement level information of the system message, repetition times requirement information of the system message, and/or receiving attempt times requirement information of the terminal device is acquired, corresponding configuration information is determined by searching the correspondence; or a system message configuration may be acquired, and the configuration information is determined according to the system message configuration and with reference to acquired information such as the coverage enhancement requirement information of the system message, the coverage enhancement level information of the system message, the repetition times requirement information of the system message, and/or the receiving attempt times requirement information of the terminal device.

If the configuration information is directly determined according to the acquired information such as the coverage enhancement requirement information of the system message, the coverage enhancement level information of the system message, the repetition times requirement information of the system message, and/or the receiving attempt times requirement information of the terminal device, details may be as follows:

Transmission times of the system message is determined according to the acquired information such as the coverage enhancement requirement information of the system message, the coverage enhancement level information of the system message, the repetition times requirement information of the system message, and/or the receiving attempt times requirement information of the terminal device, then a window length of the system message window is acquired, and then information about a subframe used when the system message is transmitted is determined according to the window length of the system message window and the transmission times of the system message.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

When system message transmission configuration is being performed in the system message window, a coverage enhancement requirement may be met in multiple manners, which may be specifically as follows:

(1) The coverage enhancement requirement is met by means of repeated transmission.

That is, different repetition times may meet different coverage enhancement requirements.

A. If different coverage enhancement requirements are corresponding to different repetition times, times for which the system message needs to be sent in the system message window are also different, and in this case, quantities of required subframes and corresponding locations of the subframes are also different, that is, the different coverage enhancement requirements are corresponding to different system message transmission configurations in the system message window.

B. If a same coverage enhancement requirement is corresponding to same repetition times, times for which the system message needs to be sent in the system message window may be the same or may be different, and locations of subframes for sending the system message may be the same or may be different. If the locations of the subframes for sending the system message are different, the same coverage enhancement requirement is corresponding to different system message transmission configurations in the system message window.

For example, in an example, the coverage enhancement requirement requires that the system message is transmitted for four times, which may be specifically as follows:

If the length of the system message window is greater than 4 ms, the system message may be transferred in the system message window for four times, and four subframes may be selected from the system message window to transmit the system message. For example, the four subframes are the first four subframes or the last four subframes; or if the length of the message window is 40 ms, it may be specified that subframes 1 in all radio frames of four radio frames in the system message window are used to send the system message, and the system message is sent for four times in total; or it may be specified that a subframe 0 in a radio frame 1, a subframe 3 in a radio frame 2, a subframe 5 in a radio frame 3, and a subframe 6 in a radio frame 4 are used to send the system message, the system message is sent for four times in total, and so on. Examples are not listed herein again.

If the system message cannot be transmitted in the system message window for four times, for example, if the length of the system message window is 1 ms or 2 ms, the terminal device that has a coverage enhancement requirement may extend the system message window by using the original system message window as a reference. For example, if the length of the original system message window is 1 ms, and it is learned, by means of calculation, that a location in the system message window is a subframe 3 in a radio frame 2, the subframe 3 in the radio frame 2 may be used as a start subframe from which the system message window is extended for coverage enhancement, and the system message window is extended backward by three subframes, that is, the subframe 3, a subframe 4, a subframe 5, and a subframe 6 that are in the radio frame 2 are used as the extended system message window; or the subframe 3 may be used as an end subframe to which the system message window is extended, that is, a subframe 0, a subframe 1, a subframe 2, and the subframe 3 are used as the extended system message window. Certainly, the subframe 3 may also be used as a middle location of expansion of the system message window, and details are not described herein again.

If the window length of the system message window is not sufficient to transmit the system message for four times, in addition to expansion of the system message window, the system message may be separately transmitted in multiple consecutive system message windows, that is, the system message may be separately transmitted in the multiple consecutive system message windows for four times. For example, if the length of the system message window is 2 ms, the system message may be transferred in the first system message window twice, and the system message is transferred in the second system message window twice.

Even if the system message can be transferred in the system message window for four times, the original system message window may also be extended to transmit the system message, or the system information is transmitted in multiple consecutive system information windows for four times in total. Details are not described herein again.

In addition, transmission times required by the system message are greater than or equal to the window length of the system message window, the system message may be transferred in all available subframes in the system message window.

(2) The coverage enhancement requirement is met by means of adjustment of receiving attempt times of the terminal device, without signal repetition.

In this case, any subframe may be selected from the system message window to send the system message.

(3) The coverage enhancement requirement is met by means of single repetition and adjustment of receiving attempt times of the terminal device.

A same coverage enhancement requirement may be met by different receiving attempt times of the terminal device and different single repetition receiving times together. For example, a coverage enhancement requirement of 5 dB may be met by three receiving attempts of the terminal device and six times of single repetition together, or may be met by two receiving attempts of the terminal device and ten times of single repetition together.

For a same coverage enhancement requirement, receiving attempt times of the terminal device are configured to be different; therefore, information repetition times are also different accordingly, and transmission times that are of the system message in the system message window and corresponding to the same coverage enhancement requirement are also different, which causes a difference in selection of subframes for sending the system message, that is, the same coverage enhancement requirement is corresponding to different system message transmission configurations in the system message window.

Optionally, a receiving attempt mode of the terminal device may be defined, and the transmission times of the system message in the system message window and a subframe that is in the system message window and for sending the system message are determined according to the determined receiving attempt mode. In the receiving attempt mode, combination times in each receiving attempt of receiving attempt times of the terminal device, and maximum receiving attempt times may be defined.

For example, if system information in four subframes are combined in each receiving attempt of the terminal device, if the length of the system message window is greater than 4 ms, four subframes may be selected from each system message window to transfer the system message for four times, and the terminal device performs combination in each system information window in an accumulative manner, which is used as one receiving attempt of the terminal device; or the system message is transferred in two adjacent message receiving windows respectively twice, and the system messages in the two adjacent message receiving windows are combined, which is used as one receiving attempt of the terminal device.

Further, if a relatively large quantity of receiving attempt times of the terminal device are required, for example, if 16 receiving attempts of the terminal device are required, if only resources of the original system message window are used, a time required before the terminal device receives the system message may be relatively long. Therefore, in this case, it may be considered that extension is to be performed on the original system message window. An extension manner is similar to the foregoing described extension manner of a system message window, and details are not described herein again.

In addition, the system message configuration may further be determined according to a determined coverage enhancement requirement of the system information and/or the determined receiving attempt mode of the terminal device, where the system message configuration may include one or more of the length of the system message window, a system message sending period, and a system message update period. For example, if the coverage enhancement requirement is relatively high, and a relatively large quantity of repetition times are required, for example, 16 times of repetition, the length of the system message window may be configured to be 20 ms, 40 ms, or the like. Alternatively, if the receiving attempt times of the terminal device are in a relatively large quantity, the system message sending period may be configured to be a relatively small value or the like.

503. The base station device notifies the terminal device of the configuration information.

For example, specifically, the configuration information may be notified to the terminal device in a form of an independent message, or may be carried in an existing message and notified to the terminal device. Details are not described herein again.

504. The base station device transmits the system message on a resource indicated by the configuration information.

That is, the system message is transmitted according to the window length of the system message window, the system message period, the system message update period, the information about the subframe used when the system message is transmitted, and/or the transmission times of the system message in the system message window, and the like.

505. The terminal device receives the configuration information, and receives, on the resource indicated by the configuration information, the system message sent by the base station device.

Subsequently, the terminal device may further perform processing on the received system message, for example, perform operations such as a receiving and combination operation and a receiving attempt operation.

It may be learned from the foregoing that, in this embodiment, the following solution is used: A base station device determines configuration information, where the configuration information indicates a system message transmission configuration in a system message window; notifies a terminal device of the configuration information; and then transmits a system message according to the configuration information. In this case, the terminal device may receive, according to the configuration information, the system message sent by the base station device. In this solution, the terminal device can exactly know the system message transmission configuration in the system message window in a notification manner; therefore, it is helpful for the terminal device to subsequently perform operations such as a receiving and combination operation and a receiving attempt operation, which can reduce processing complexity of the terminal device, and improve a coverage enhancement effect.

Embodiment 7

What is the same as Embodiment 6 is that this embodiment also provides a description by using an example in which a network side device is specifically integrated into a base station device. What is different from Embodiment 6 is that, in this embodiment, configuration information is agreed by the base station device and a terminal device in advance instead of being notified by the base station device to the terminal device. The following provides a detailed description.

Figure 6:
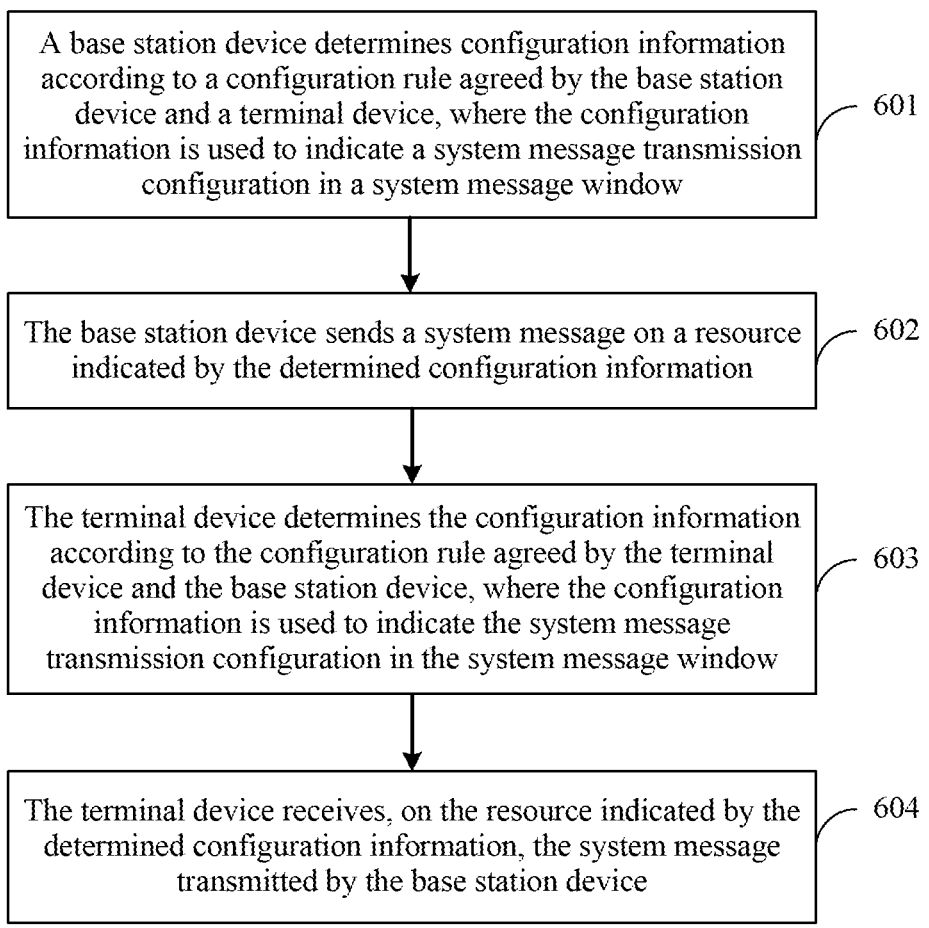
FIG. 6 is yet another flowchart of a coverage enhancement transmission method for a system message according to an embodiment of the present invention.

As shown in FIG. 6, a coverage enhancement transmission method for a system message is provided, and a specific procedure may be as follows:

601. A base station device determines configuration information according to a configuration rule agreed by the base station device and a terminal device, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 milliseconds (ms, millisecond), any two available subframes may be selected from 10 subframes in a length of 10 ms (1 ms is also a length of one subframe) to transmit the system message twice. Numbers of subframes that are in the system message window and used for transmission of the system message may be listed in an enumeration manner.

The configuration rule agreed by the base station device and the terminal device may be separately preset by a user on the base station device and the terminal device, which may be specifically, for example, as follows:

Corresponding system message configurations and system message transmission configurations in the system message window are set for different information such as coverage enhancement requirement information of the system message, different coverage enhancement level information of the system message, different repetition times requirement information of the system message, and/or different receiving attempt times requirement information of the terminal device, and a mapping relationship between a system message transmission configuration in the system message window and information such as coverage enhancement requirement information, coverage enhancement level information, repetition times requirement information, and/or receiving attempt times requirement information of the terminal device, and a mapping relationship between a system message configuration and a system message transmission configuration that is in the system message window are stored.

Alternatively, the configuration rule agreed by the base station device and the terminal device may be notified to the terminal device after being determined by the base station, which may be specifically, for example, as follows:

The base station device sets corresponding system message transmission configurations in the system message window for different information such as coverage enhancement requirement information of the system message, different coverage enhancement level information of the system message, different repetition times requirement information of the system message, and/or receiving attempt times requirement information of the terminal device, stores a mapping relationship between a system message transmission configuration in the system message window and information such as coverage enhancement requirement information, coverage enhancement level information, repetition times requirement information, or receiving attempt times requirement information of the terminal device, and then sends the mapping relationship to the terminal device, so that the terminal device stores the mapping relationship.

For a setting relationship between a system message transmission configuration in the system message window and information such as coverage enhancement requirement information, coverage enhancement level information, repetition times requirement information, or receiving attempt times requirement information of the terminal device, and a setting relationship between a system message configuration and a system message transmission configuration that is in the system message window, reference may be made to the foregoing embodiments (such as Embodiment 5). Details are not described herein again.

602. The base station device sends a system message on a resource indicated by the determined configuration information.

That is, the system message is transmitted according to a window length of the system message window, a system message period, a system message update period, the information about the subframe used when the system message is transmitted, and/or the transmission times of the system message in the system message window, and the like.

603. The terminal device determines the configuration information according to the configuration rule agreed by the terminal device and the base station device, where the configuration information is used to indicate the system message transmission configuration in the system message window.

The system message transmission configuration in the system message window may include the information about the subframe used when the system message is transmitted. In addition, optionally, the system message transmission configuration may further include the transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window.

The configuration rule agreed by the terminal device and the base station device may be separately preset by the user on the base station device and the terminal device, which may be specifically, for example, as follows:

Corresponding system message configurations and system message transmission configurations in the system message window are set for different coverage enhancement requirement information of the system message, different coverage enhancement level information of the system message, different repetition times requirement information of the system message, and/or different receiving attempt times requirement information of the terminal device, and a mapping relationship between a system message transmission configuration in the system message window and coverage enhancement requirement information, coverage enhancement level information, repetition times requirement information, or receiving attempt times requirement information of the terminal device, and a mapping relationship between a system message configuration and a system message transmission configuration that is in the system message window are stored.

For a setting relationship between a system message transmission configuration in the system message window and information such as coverage enhancement requirement information, coverage enhancement level information, repetition times requirement information, or receiving attempt times requirement information of the terminal device, and a setting relationship between a system message configuration and a system message transmission configuration that is in the system message window, reference may be made to the foregoing embodiments (such as Embodiment 5). Details are not described herein again.

In addition, it should be further noted that a manner that is of determining the configuration information and used by the terminal device should keep consistent with a manner used by the base station device.

604. The terminal device receives, on the resource indicated by the determined configuration information, the system message transmitted by the base station device.

Subsequently, the terminal device may further perform processing on the received system message, for example, perform operations such as a receiving and combination operation and a receiving attempt operation.

It may be learned from the foregoing that, in this embodiment, the following solution is used: A base station device and a terminal device agree on a configuration rule in advance, then the base station device and the terminal device separately determine current configuration information according to the agreed configuration rule, where the configuration information indicates a system message transmission configuration in a system message window, then the base station device sends a system message on a resource indicated by the configuration information, and the terminal device receives the system message on the resource indicated by the configuration information. In this solution, the terminal device can exactly know the system message transmission configuration in the system message window in a manner of agreement between the base station device and the terminal device; therefore, it is helpful for the terminal device to subsequently perform operations such as a receiving and combination operation and a receiving attempt operation, which can reduce processing complexity of the terminal device, and improve a coverage enhancement effect.

Embodiment 8

Figure 7:
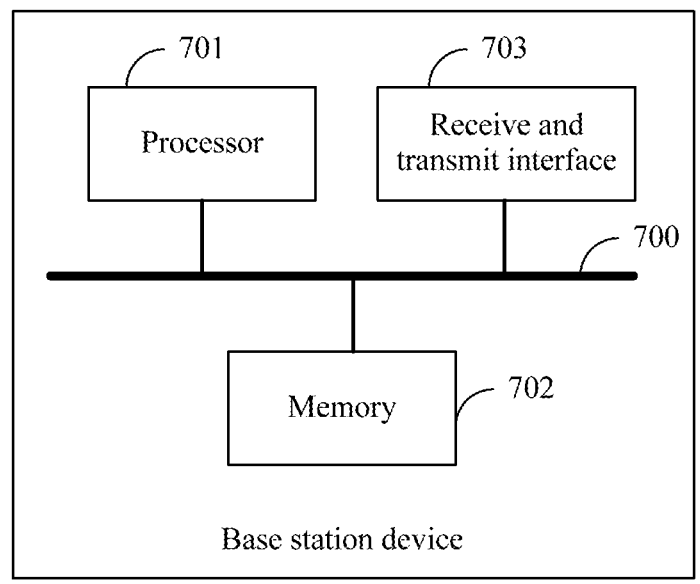
FIG. 7 is a schematic structural diagram of a base station device according to an embodiment of the present invention.

In addition, this embodiment of the present invention further provides a base station device. As shown in FIG. 7, the base station device includes: a processor 701, a memory 702 configured to store data, and a receive and transmit interface 703 configured to receive and transmit data, where the processor 701 is connected to the memory 702 and the receive and transmit interface 703 by using a bus (BUS) 700. Functions of all parts in the base station device may be specifically as follows:

The processor 701 is configured to: determine configuration information, where the configuration information is used to indicate a system message transmission configuration in a system message window; and control the receive and transmit interface 703 to send a system message on a resource indicated by the configuration information.

The system message transmission configuration in the system message window may include information about a subframe used when the system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 milliseconds (ms, millisecond), any two available subframes may be selected from 10 subframes in a length of 10 ms (1 ms is also a length of one subframe) to transmit the system message twice.

Numbers of subframes that are in the system message window and used for transmission of the system message may be listed in an enumeration manner.

The receive and transmit interface 703 is configured to send, under the control of the processor 701, the system message on the resource indicated by the configuration information, so that a terminal device receives the system message according to the configuration information.

The configuration information may be known by the terminal device in a manner of agreement between the base station device and the terminal device, or may be notified to the terminal device after being directly determined by the network side device. If the configuration information is known by the terminal device in the manner of agreement between the base station device and the terminal device, the processor 701 may be configured to determine the configuration information according to a configuration rule agreed by the base station device and the terminal device.

If a manner of directly notifying the terminal device is used, the processor 701 may be further configured to control the receive and transmit interface 703 to notify the terminal device of the configuration information; and the receive and transmit interface 703 may be configured to notify the terminal device of the configuration information under the control of the processor 701.

If the system message transmission configuration indicates that the system message is to be transmitted in all available subframes in the system message window, in this case, the system message may be sent in all the available subframes in the system message window. That is, the processor 701 may be specifically configured to: when the system message transmission configuration indicates that the system message is to be transmitted in all the available subframes in the system message window, control the receive and transmit interface 703 to send the system message in all the available subframes in the system message window; and the receive and transmit interface 703 may be specifically configured to send the system message in all the available subframes in the system message window under the control of the processor 701.

If the system transmission configuration indicates that the system message is to be transmitted in some subframes in the system message window, in this case, the system message may be sent in these specified subframes. That is, the receive and transmit interface 703 may be specifically configured to send the system message in a selected subframe.

When determining the configuration information (that is, the system message transmission configuration in the system message window), the processor 701 may use multiple manners, which may be specifically, for example, as follows:

(1) First Manner:

A system message configuration may be first acquired, and then the configuration information is determined according to the system message configuration. That is, the processor 701 may be specifically configured to: acquire the system message configuration, where the system message configuration includes a configuration of a window length of the system message window and a configuration of a system message period; and determine the configuration information according to the acquired system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by the network side device and the terminal device according to a specific configuration rule, or may be determined by the network side device, and notified to the terminal device. For example, the network side device may determine a mapping table used to record "the correspondence between a system message configuration and configuration information (that is, a system message transmission configuration)", and then notify the terminal device of the mapping table.

The system message configuration may include the configuration of the window length (si-WindowLength) of the system message window, the configuration of the system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame (Radio Frame).

It should be noted that different system messages may have different system message configurations, or may have a same system message configuration, and a system message configuration of a same system message may also be adjusted according to a requirement in an actual application, that is, a base station may select a proper window length of a system message window and a proper system message period as required, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device. That is, the processor 701 is specifically configured to: acquire the coverage enhancement requirement information of the system message, the coverage enhancement level information of the system message, the repetition times requirement information of the system message, and/or the receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by the network side device and the terminal device according to a specific configuration rule, or may be determined by the network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to the foregoing embodiments, and details are not described herein again.

As two coverage enhancement technologies, signal repetition (that is, repetition times requirement information) and "a receiving attempt of the terminal device" may be used in combination. Combinations of different repetition times and different receiving attempt times of the terminal device may meet different coverage enhancement requirements.

Specifically, when the system message window is being configured, a coverage enhancement requirement, a coverage enhancement level, a requirement of repetition times, and/or a requirement of receiving attempt times of the terminal device may also be configured in the system message window. For example, reference may be made to FIG. 1b and FIG. 1c, and details are not described herein again.

When determining the configuration information (that is, the system message transmission configuration in the system message window), the processor 701 may first determine a system message configuration according to the acquired information such as the coverage enhancement requirement information of the system message, the coverage enhancement level information of the system message, the repetition times requirement information of the system message, and/or the receiving attempt times requirement information of the terminal device, and then determine the configuration information according to the determined system message configuration; or may preset the correspondence between the configuration information and information such as coverage enhancement requirement information of the system message, coverage enhancement level information of the system message, repetition times requirement information of the system message, and/or receiving attempt times requirement information of the terminal device, and after acquiring information such as coverage enhancement requirement information of the system message, coverage enhancement level information of the system message, repetition times requirement information of the system message, and/or receiving attempt times requirement information of the terminal device, determine corresponding configuration information by searching the correspondence; or may acquire a system message configuration, and determine the configuration information according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, the processor 701 may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message configuration; or the processor 701 may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or the processor 701 may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The processor 701 may be specifically configured to: determine the transmission times of the system message (that is, total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, the information about the subframe used when the system message is transmitted.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to transmit the system message, where N is the transmission times of the system message in the system message window, and N is an integer greater than 0. That is, the processor 701 may be specifically configured to: when the window length (that is, the window length of the system message window) is sufficient to transmit N system messages, select a subframe from the system message window to transmit the system message; or when the window length is not sufficient to transmit N system messages, extend the system message window, and select a subframe from the extended system message window to transmit the system message.

Certainly, when the window length (that is, the window length of the system message window) is sufficient to transmit N system messages, the processor 701 may also extend the system message window, and select a subframe from the extended system message window to transmit the system message.

Optionally, the system message window may not be extended, and instead, a subframe is selected from multiple consecutive system message windows to transmit the system message. That is, the processor 701 may be specifically configured to select, according to the window length and the transmission times, a subframe from the multiple consecutive system message windows of the determining unit to transmit the system message.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, details may be as follows:

The processor 701 is specifically configured to: acquire the system message period; determine whether the system message period exceeds a preset period threshold; and if the period exceeds the period threshold, when it is determined that the window length is sufficient to transmit N system messages, select a subframe from the system message window to transmit the system message, or extend the system message window, and select a subframe from the extended system message window to transmit the system message, or when the window length is not sufficient to transmit N system messages (N is the transmission times of the system message), extend the system message window, and select a subframe from the extended system message window to transmit the system message; or if the period does not exceed the period threshold, select, according to the window length and the transmission times, a subframe from the multiple consecutive system message windows to transmit the system message.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, the processor 701 may be specifically configured to: determine the receiving attempt times of the terminal device according to the receiving attempt times requirement information of the terminal device, and when it is determined that the receiving attempt times are greater than a preset threshold, extend the system message window; and select, according to the window length of the system message window and the transmission times of the system message in the system message window, a subframe from the extended system message window to transmit the system message.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

For specific implementation of the foregoing parts, reference may be made to the foregoing embodiments, and details are not described herein again.

It may be learned from the foregoing that the base station device in this embodiment may determine configuration information, where the configuration information is used to indicate a system message transmission configuration in a system message window; and then send a system message on a resource indicated by the configuration information, so that a terminal device receives the system message according to the configuration information. In this solution, the terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

Embodiment 9

Figure 8:
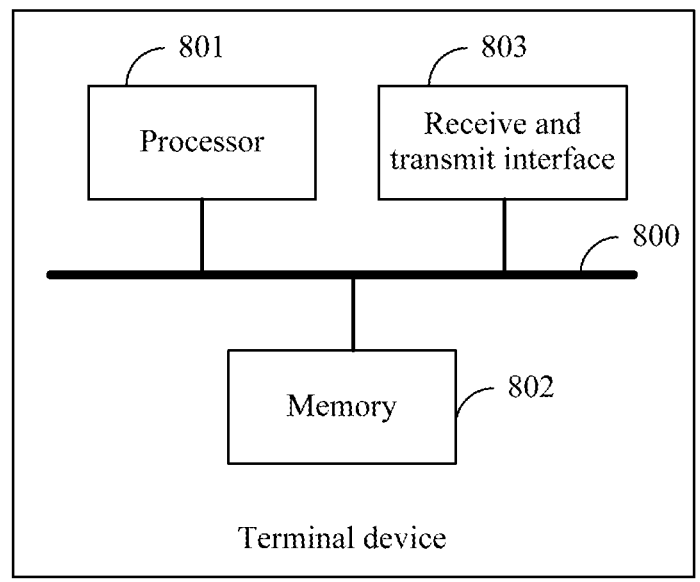
FIG. 8 is a schematic structural diagram of a terminal device according to an embodiment of the present invention.

This embodiment of the present invention further provides a terminal device. As shown in FIG. 8, the terminal device includes: a processor 801, a memory 802 configured to store data, and a receive and transmit interface 803 configured to receive and transmit data, where the processor 801 is connected to the memory 802 and the receive and transmit interface 803 by using a bus (BUS) B00. Functions of all parts in the terminal device may be specifically as follows:

The processor 801 is configured to determine configuration information, where the configuration information is used to indicate a system message transmission configuration in a system message window.

The system message transmission configuration in the system message window may include information about a subframe used when a system message is transmitted. In addition, optionally, the system message transmission configuration may further include transmission times of the system message, where the transmission times of the system message may also be determined according to the information about the subframe used when the system message is transmitted.

It should be noted that different system messages may have different system message transmission configurations in a system message window, or may have a same system message transmission configuration in a system message window; a same system message may have different system message transmission configurations in a system message window, or may have a same system message transmission configuration in a system message window. For example, if a system message needs to be transmitted in one system message window twice, if a window length of the system message window is 10 ms, any two available subframes may be selected from 10 subframes in a length of 10 ms (1 ms is also a length of one subframe) to transmit the system message twice.

Numbers of subframes that are in the system message window and used for transmission of the system message may be listed in an enumeration manner.

The receive and transmit interface 803 is configured to receive, on a resource indicated by the configuration information, the system message sent by a base station device.

The configuration information may be obtained in a manner of agreement between the terminal device and the base station device, or may be directly notified to the terminal device after being determined by the base station device. That is, the processor 801 may be specifically configured to determine the configuration information according to a configuration rule agreed by the terminal device and the base station device; or the receive and transmit interface 803 may be further configured to receive a notification that is about the configuration information and sent by the base station device; and in this case, the processor 801 may be specifically configured to determine the configuration information according to the notification (that is, the notification about the configuration information).

If the system message transmission configuration indicates that the system message is to be transmitted in all available subframes in the system message window, in this case, it indicates that the base station device sends the system message in all the available subframes in the system message window. Therefore, the system message sent by the base station device may be received in all the available subframes in the system message window. That is, the receive and transmit interface 803 may be specifically configured to: when the system message transmission configuration indicates that the system message is to be transmitted in all the available subframes in the system message window, receive, in all the available subframes in the system message window, the system message sent by the base station device.

If the system transmission configuration indicates that the system message is to be transmitted in some subframes in the system message window, in this case, the system message sent by the base station device may be received in these specified subframes. That is, the receive and transmit interface 803 may be specifically configured to receive, in a selected subframe, the system message sent by the base station device.

If the configuration information is determined according to the configuration rule agreed by the terminal device and the base station device, a determining manner used by the terminal device should keep consistent with a manner used by the base station device. When determining the configuration information (that is, the system message transmission configuration in the system message window), the processor 801 may use either of the following manners (only provided that the manner keeps consistent with a manner used by the base station device), which may be specifically, for example, as follows:

(1) First Manner:

A system message configuration may be first acquired, and then the configuration information is determined according to the system message configuration. That is, the processor 801 may be specifically configured to acquire the system message configuration, and determine the configuration information according to the acquired system message configuration.

For example, a correspondence between a system message configuration and configuration information (that is, a system message transmission configuration) may be first defined, and then after a system message configuration is acquired, corresponding configuration information (that is, a system message transmission configuration) may be obtained by querying the correspondence.

The foregoing correspondence between a system message configuration and configuration information (that is, a system message transmission configuration) may be determined by a network side device and the terminal device according to a specific configuration rule, or may be determined by a network side device, and notified to the terminal device. For example, the network side device may determine a mapping table used to record "the correspondence between a system message configuration and configuration information (that is, a system message transmission configuration)", and then notify the terminal device of the mapping table.

The system message configuration may include a configuration of a window length (si-WindowLength) of the system message window, a configuration of a system message period (si-Periodicity), and the like. In addition, the system message configuration may further include a system message update period and the like. For example, the window length of the system message window may be (ms1, ms2, ms5, ms10, ms15, ms20, ms40), and the like, and the period of the system message window may be (rf8, rf16, rf32, rf64, rf128, rf256, rf512), and the like, where rf refers to a radio frame (Radio Frame).

It should be noted that different system messages may have different system message configurations, or may have a same system message configuration, and a system message configuration of a same system message may also be adjusted according to a requirement in an actual application, that is, a base station may select a proper window length of a system message window and a proper system message period according to a requirement, to constitute a system message configuration.

(2) Second Manner:

Specifically, information such as coverage enhancement requirement information of the system message, coverage enhancement level information of the system message, repetition times requirement information of the system message, and/or receiving attempt times requirement information of the terminal device may be first acquired, and then the system message transmission configuration in the system message window is determined according to the acquired information such as the coverage enhancement requirement information of the system message, the coverage enhancement level information of the system message, the repetition times requirement information of the system message, and/or the receiving attempt times requirement information of the terminal device. That is, the processor 801 may be specifically configured to: acquire the information such as the coverage enhancement requirement information of the system message, the coverage enhancement level information of the system message, the repetition times requirement information of the system message, and/or the receiving attempt times requirement information of the terminal device; and determine the configuration information according to the acquired coverage enhancement requirement information of the system message, the acquired coverage enhancement level information of the system message, the acquired repetition times requirement information of the system message, and/or the acquired receiving attempt times requirement information of the terminal device.

A correspondence between configuration information (that is, a system message transmission configuration) and the foregoing various requirement information (that is, information such as coverage enhancement requirement information of the system message, coverage enhancement level information of the system message, repetition times requirement information of the system message, and/or receiving attempt times requirement information of the terminal device) may be determined by a network side device and the terminal device according to a specific configuration rule, or may be determined by a network side device, and notified to the terminal device. For example, the network side device may determine a mapping table used to record "the correspondence between configuration information (that is, a system message transmission configuration) and requirement information (that is, information such as coverage enhancement requirement information of the system message, coverage enhancement level information of the system message, repetition times requirement information of the system message, and/or receiving attempt times requirement information of the terminal device)", and then notify the terminal device of the mapping table.

In addition, it should be noted that the information such as the coverage enhancement requirement information of the system message, the coverage enhancement level information of the system message, the repetition times requirement information of the system message, and/or the receiving attempt times requirement information of the terminal device may be set by using multiple policies; for example, the information such as the coverage enhancement requirement information of the system message, the coverage enhancement level information of the system message, the repetition times requirement information of the system message, and/or the receiving attempt times requirement information of the terminal device may be exclusively set for the system message. Alternatively, a coverage enhancement level of the terminal device may be set, a coverage enhancement level of the system message is determined according to the coverage enhancement level of the terminal device, and then the information (that is, the information such as the coverage enhancement requirement information of the system message, the coverage enhancement level information of the system message, the repetition times requirement information of the system message, and/or the receiving attempt times requirement information of the terminal device) is determined according to the coverage enhancement level of the system message. Details are not described herein again.

For specific descriptions of the coverage enhancement requirement information of the system message, the coverage enhancement level information of the system message, the repetition times requirement information of the system message, and/or the receiving attempt times requirement information of the terminal device, and the like, reference may be made to Embodiment 1, and details are not described herein again.

As two coverage enhancement technologies, signal repetition and "a receiving attempt of the terminal device" may be used in combination. Combinations of different repetition times and different receiving attempt times of the terminal device may meet different coverage enhancement requirements.

Specifically, when the system message window is being configured, a coverage enhancement requirement, a coverage enhancement level, a requirement of repetition times, and/or a requirement of receiving attempt times of the terminal device may also be configured in the system message window. For example, refer to FIG. 1b and FIG. 1c, and details are not described herein again.

When determining the configuration information (that is, the system message transmission configuration in the system message window), the processor 801 may first determine a system message configuration according to the acquired information such as the coverage enhancement requirement information of the system message, the coverage enhancement level information of the system message, the repetition times requirement information of the system message, and/or the receiving attempt times requirement information of the terminal device, and then determine the configuration information (that is, the system message transmission configuration in the system message window) according to the determined system message configuration; or may preset the correspondence between the configuration information and information such as coverage enhancement requirement information of the system message, coverage enhancement level information of the system message, repetition times requirement information of the system message, and/or receiving attempt times requirement information of the terminal device, and after acquiring information such as coverage enhancement requirement information of the system message, coverage enhancement level information of the system message, repetition times requirement information of the system message, and/or receiving attempt times requirement information of the terminal device, determine corresponding configuration information by searching the correspondence; or may acquire a system message configuration, and determine the configuration information according to the system message configuration and with reference to the acquired information such as the coverage enhancement requirement information of the system message, the coverage enhancement level information of the system message, the repetition times requirement information of the system message, and/or the receiving attempt times requirement information of the terminal device. That is, the processor 801 may be specifically configured to: determine the system message configuration according to the acquired coverage enhancement requirement information of the system message, the acquired coverage enhancement level information of the system message, the acquired repetition times requirement information of the system message, and/or the acquired receiving attempt times requirement information of the terminal device; and determine the configuration information according to the determined system message; or the processor 801 may acquire the system message configuration in addition to the information such as the coverage enhancement requirement information of the system message, the coverage enhancement level information of the system message, the repetition times requirement information of the system message, and/or the receiving attempt times requirement information of the terminal device; and then determine the configuration information according to the acquired system message configuration and with reference to the acquired information such as the coverage enhancement requirement information of the system message, the coverage enhancement level information of the system message, the repetition times requirement information of the system message, and/or the receiving attempt times requirement information of the terminal device; or the processor 801 may be specifically configured to directly determine the configuration information according to the acquired information such as the coverage enhancement requirement information of the system message, the coverage enhancement level information of the system message, the repetition times requirement information of the system message, and/or the receiving attempt times requirement information of the terminal device, which may be specifically as follows:

The processor 801 may be specifically configured to: determine the transmission times of the system message (that is, total transmission times of the system message) according to the acquired coverage enhancement requirement information of the system message, the acquired coverage enhancement level information of the system message, the acquired repetition times requirement information of the system message, and/or the acquired receiving attempt times requirement information of the terminal device; acquire a window length of the system message window; and determine, according to the window length and the transmission times, the information about the subframe used when the base station device transmits the system message.

The window length of the system message window may be acquired in multiple manners. For example, the system message configuration may be acquired, and then the window length of the system message window is extracted from the system message configuration.

The information about the subframe may include at least a location of the subframe, and in addition, the information about the subframe may further include information such as a quantity of subframes. That is, the information about the subframe may indicate a specific quantity of subframes, and a specific subframe for transmitting the system message.

In addition, when a subframe for transmitting the system message is being selected, if the window length of the system message window is not sufficient to transmit N system messages, the system message window may also be extended, so that subsequently, a subframe can be selected from the extended system message window to receive the system message sent by the base station device, where N is the transmission times of the system message in the system message window, and N is an integer greater than 0. That is, the processor 801 may be specifically configured to: when the window length is sufficient to transmit N system messages, select a subframe from the system message window to receive the system message sent by the base station device, where N is the transmission times of the system message; or when the window length is not sufficient to transmit N system messages, extend the system message window, and select a subframe from the extended system message window to receive the system message sent by the base station device.

Certainly, when the window length (that is, the window length of the system message window) is sufficient to transmit N system messages, the processor 801 may also extend the system message window, and select a subframe from the extended system message window to receive the system message sent by the base station device.

Optionally, the system message window may not be extended, and instead, a subframe is selected from multiple consecutive system message windows to receive the system information sent by the base station device. That is, the processor 801 may be specifically configured to select, according to the window length and the transmission times, a subframe from the multiple consecutive system message windows to receive the system message sent by the base station device.

Optionally, it may be determined, according to a system message period, whether a manner of extending the system message window or a manner of using multiple consecutive system message windows is used. For example, if the system message period is longer, the manner of extending the system message window is used, and if the system message period is shorter, the manner of using the multiple consecutive system message windows is used. That is, the processor 801 may be specifically configured to: acquire the system message period; determine whether the system message period exceeds a preset period threshold; and if the period exceeds the period threshold, when it is determined that the window length is sufficient to transmit N system messages, select a subframe from the system message window to receive the system message sent by the base station device, or extend the system message window, and select a subframe from the extended system message window to receive the system message sent by the base station device, or when the window length is not sufficient to transmit N system messages, extend the system message window, and select a subframe from the extended system message window to receive the system message sent by the base station device; or if the period does not exceed the period threshold, select, according to the window length and the transmission times, a subframe from the multiple consecutive system message windows to receive the system message sent by the base station device.

The period threshold may be set according to a requirement in an actual application, and details are not described herein again.

Optionally, when a relatively large quantity of receiving attempt times of the terminal device are required, if only resources of the original system message window are used, a time required before the terminal device receives the system message may be relatively long. Therefore, in order to reduce the time required before the terminal device receives the system message, in this case, the system message window may also be extended. That is, the processor 801 is specifically configured to: determine the receiving attempt times of the terminal device according to the receiving attempt times requirement information of the terminal device, and when it is determined that the receiving attempt times are greater than a preset threshold, extend the system message window; and select, according to the window length and the transmission times, a subframe from the extended system message window to receive the system message sent by the base station device.

Certainly, the system message window is extended; therefore, times for which the system message can be transmitted in a same system message window also increase, and in this case, the receiving attempt times of the terminal device may also decrease accordingly. In addition, when there are a relatively large quantity of receiving attempt times of the terminal device, a relatively short system message period may be selected. Details are not described herein again.

The terminal device may be specifically a device such as a mobile phone, a tablet computer, or a personal computer.

For specific implementation of the foregoing parts, reference may be made to the foregoing embodiments, and details are not described herein again.

It may be learned from the foregoing that the terminal device in this embodiment may determine configuration information, where the configuration information is used to indicate a system message transmission configuration in a system message window; and then receive, on a resource indicated by the configuration information, a system message sent by a base station device. In this solution, the terminal device can exactly know the system message transmission configuration in the system message window; therefore, it is helpful for the terminal device to subsequently perform operations such as a receiving and combination operation and a receiving attempt operation, which can reduce processing complexity of the terminal device, and improve a coverage enhancement effect.

A person of ordinary skill in the art may understand that all or some of the steps of the methods in the embodiments may be implemented by a program instructing relevant hardware. The program may be stored in a computer-readable storage medium. The storage medium may include: a read-only memory (ROM, Read-Only Memory), a random access memory (RAM, Random Access Memory), a magnetic disk, or an optical disc.

The foregoing describes in detail a network side device, system, and method for a system message according to the embodiments of the present invention. Specific examples are used in this specification to describe the principle and implementation manners of the present invention. The descriptions of the foregoing embodiments are merely intended to help understand the method and core idea of the present invention. In addition, a person skilled in the art may, according to the idea of the present invention, make modifications with respect to the specific implementation manners and the application scope. Therefore, the content of this specification shall not be construed as a limitation on the present invention.

What is claimed is:

1. A network side device comprising:
   a transmitter;
   a processor; and
   a memory storing a program to be executed in the processor, the program comprising instructions to:
   obtain acquire a system message transmission configuration of a system message;
   determine repetition times requirement information of the system message disposed in a mapping table;
   determine a subframe used when the system message is transmitted in a system message window according to the system message transmission configuration and the repetition times requirement information;
   cause the transmitter to notify a terminal of the determined subframe used when the system message is transmitted in the system message window according to the system message transmission configuration;
   cause the transmitter to notify the terminal of the repetition times requirement information; and
   cause the transmitter to send the system message in the determined subframe for a number of transmissions according to the repetition times requirement information, wherein the system message transmission configuration comprises at least one of a configuration of a window length of the system message window or a configuration of a system message period.

2. The network side device according to claim 1, wherein the program comprises instructions to identify the determined subframe used when the system message is transmitted according to the window length of the system message window and the repetition times requirement information.

3. The network side device according to claim 1, wherein the program comprises instructions to select the determined subframe from multiple consecutive system message windows according to the window length of the system message window and the repetition times requirement information.

4. A terminal device comprising:
   a processor;
   a receiver; and
   a memory storing a program to be executed in the processor, the program comprising instructions to:
   receive a notification of a subframe used to transmit a system message in a system message window according to a system message transmission configuration;
   receive repetition times requirement information of the system message,
   determine a subframe used when the system message is transmitted in the system message window according to the system message transmission configuration and repetition times requirement information; and
   attempt to receive the system message sent by a network side device in the determined subframe for a number of transmissions based on the repetition times requirement information, wherein the system message transmission configuration comprises at least one of a configuration of a window length of the system message window or a configuration of a system message period.

5. The terminal device according to claim 4, wherein:
   the program comprises instructions to: determine, according to the window length and the repetition times requirement information, the subframe used when the system message is transmitted.

6. The terminal device according to claim 4, wherein:
   the program comprises instructions to select, according to the window length and the repetition times requirement information, the subframe from multiple consecutive system message windows.

7. A coverage enhancement transmission method for a system message, performed by a network side device, the method comprising:
   obtaining a system message transmission configuration of a system message;
   determining repetition times requirement information of the system message disposed in a mapping table;
   determining a subframe used when the system message is transmitted in a system message window according to the system message transmission configuration and repetition times requirement information;
   notifying a terminal of the determined subframe used when the system message is transmitted in the system message window according to the system message transmission configuration;
   notifying the terminal of the repetition times requirement information; and
   sending the system message in the determined subframe for a number of transmissions according to the repetition times requirement information, wherein the system message transmission configuration comprises at least one of a configuration of a window length of the system message window or a configuration of a system message period.

8. The method according to claim 7, wherein further comprising:
   identifying the determined subframe used when the system message is transmitted according to the window length of the system message window and the repetition times requirement information.

9. The method according to claim 7, wherein further comprising:
   selecting the determined subframe from multiple consecutive system message windows according to the window length of the system message window and the repetition times requirement information.

10. A coverage enhancement transmission method for a system message, performed by a terminal device, the method comprising:
- receiving a notification of a subframe used when a system message is transmitted in a system message window according to a system message transmission configuration;
- receiving repetition times requirement information of the system message;
- determining a subframe used when the system message is transmitted in a system message window according to the system message transmission configuration and repetition times requirement information; and
- attempting to receive the system message sent by a network side device the determined subframe for a number of transmissions according to the repetition times requirement information, wherein the system message transmission configuration comprises at least one of a configuration of a window length of the system message window or a configuration of a system message period.

11. The method according to claim 10, further comprising: determining, according to the window length and the repetition times requirement information, the determined subframe used when the system message is transmitted.

* * * * *

UNITED STATES PATENT AND TRADEMARK OFFICE
CERTIFICATE OF CORRECTION

PATENT NO. : 10,880,818 B2
APPLICATION NO. : 15/217789
DATED : December 29, 2020
INVENTOR(S) : Xiangdong Zhang et al.

Page 1 of 1

It is certified that error appears in the above-identified patent and that said Letters Patent is hereby corrected as shown below:

In the Claims

In Column 71, Line 30, Claim 1, delete "obtain acquire a system" and insert --obtain a system--.

In Column 73, Line 15, Claim 10, delete "network side device the determined subframe" and insert --network side device in the determined subframe--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*